United States Patent [19]
Yasojima et al.

[11] Patent Number: 5,914,880
[45] Date of Patent: Jun. 22, 1999

[54] METHOD AND APPARATUS FOR CONTROLLING A TRANSFER MACHINE

[75] Inventors: Toshio Yasojima; Masanori Imai, both of Toyama-ken, Japan

[73] Assignee: Nippei Toyama Corporation, Japan

[21] Appl. No.: 08/932,502

[22] Filed: Sep. 18, 1997

Related U.S. Application Data

[63] Continuation of application No. 08/391,426, Feb. 16, 1995, abandoned, which is a continuation-in-part of application No. 08/062,931, May 17, 1993, abandoned.

[51] Int. Cl.$^6$ .................................................. G06F 19/00
[52] U.S. Cl. ........................... 364/474.01; 364/468.01; 364/468.15; 364/474.12
[58] Field of Search ..................... 364/468.19, 468.2, 364/131, 132, 133, 474, 140; 395/280

[56] References Cited

U.S. PATENT DOCUMENTS

| | | | |
|---|---|---|---|
| 3,845,286 | 10/1974 | Aronstein et al. | 364/140 |
| 4,304,001 | 12/1981 | Cope | 364/132 |
| 4,410,983 | 10/1983 | Cope | 395/280 |
| 4,564,913 | 1/1986 | Yomogida et al. | 364/474.11 |
| 4,635,189 | 1/1987 | Kendall | 364/200 |
| 4,698,629 | 10/1987 | Mori | 364/474.11 |
| 4,841,431 | 6/1989 | Takagi et al. | 364/474.11 |
| 4,858,102 | 8/1989 | Lovrenich | 364/136 |
| 4,896,087 | 1/1990 | Onaga et al. | 318/568.2 |
| 4,903,190 | 2/1990 | Akai | 364/131 |
| 4,998,194 | 3/1991 | Okamoto et al. | 364/136 |
| 5,097,405 | 3/1992 | Sato | 364/140 |
| 5,181,178 | 1/1993 | Sasaki et al. | 364/474.14 X |
| 5,237,510 | 8/1993 | Kakizawa et al. | 364/478 |
| 5,404,288 | 4/1995 | McDunn | 364/140 |

FOREIGN PATENT DOCUMENTS

| | | |
|---|---|---|
| 0107191 | 5/1991 | European Pat. Off. . |
| 0153856 | 7/1991 | European Pat. Off. . |
| 58-197508 | 5/1982 | Japan . |
| 58-197509 | 5/1982 | Japan . |
| 2-32370 | 7/1988 | Japan . |

OTHER PUBLICATIONS

German Article, Aug. 1987, Anton Friedl & Reinhard Voiler, Erlangen.
EPO Search Report.

*Primary Examiner*—Reba I. Elmore
*Assistant Examiner*—Sheela S. Rao
*Attorney, Agent, or Firm*—Watts, Hoffmann, Fisher & Heinke Co., L.P.A.

[57] ABSTRACT

A system for controlling a manufacturing system including a plurality of working units is described. Each working unit has an operational tool and a unit controller which controls the corresponding tool. Each unit controller includes a storage device for storing data about the status of multiple working units including its own. A data control device is connected to the storage device and the remainder of the unit controllers. The data control device renews unit status data stored in the storage device with the newest data about the status of the working units including that of its own working unit. Thus, all the unit controllers always have the newest unit status data in common. Each unit controller includes a drive control device for controlling the corresponding tool based on the unit status data stored in the storage device.

28 Claims, 20 Drawing Sheets

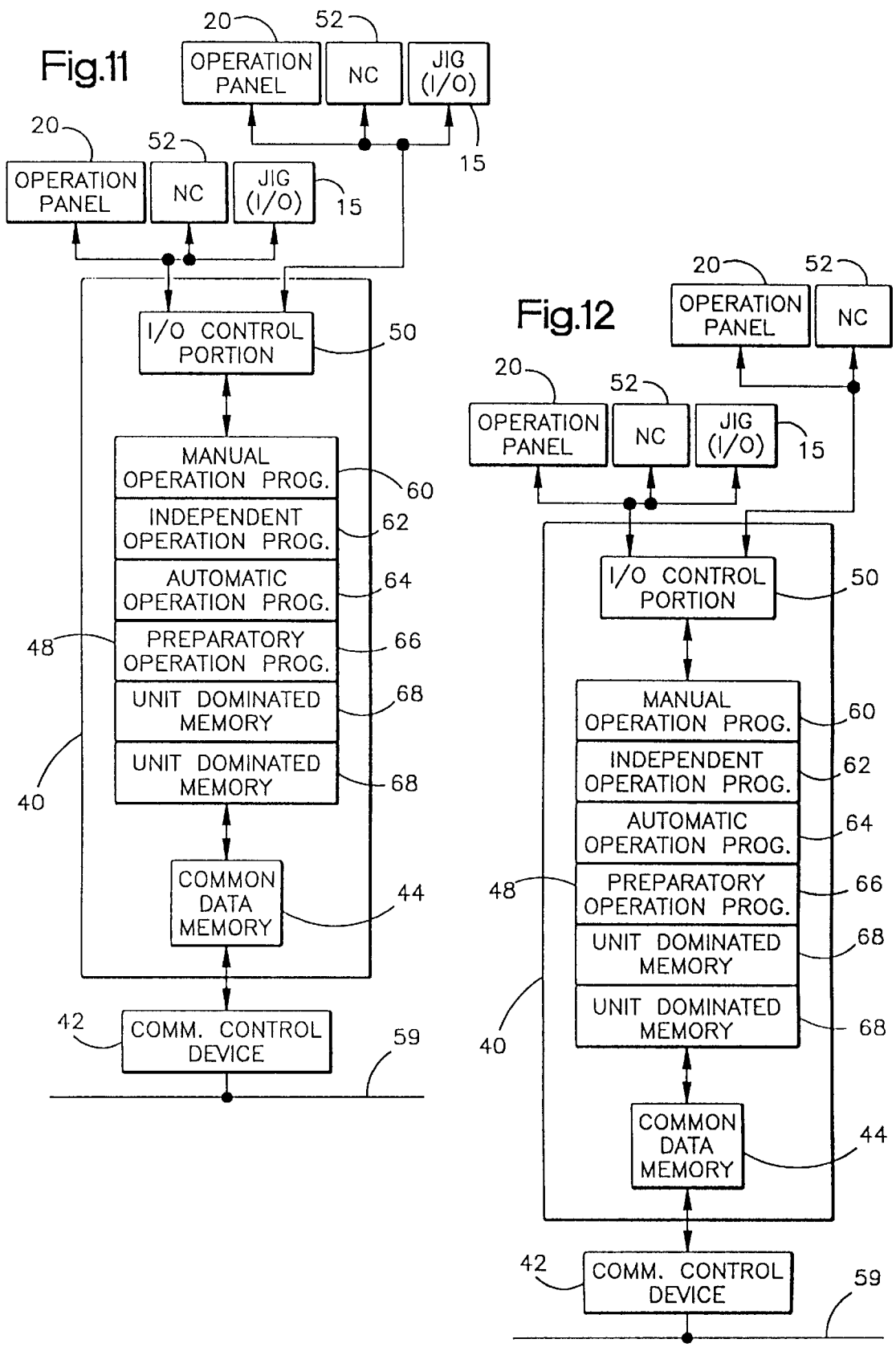

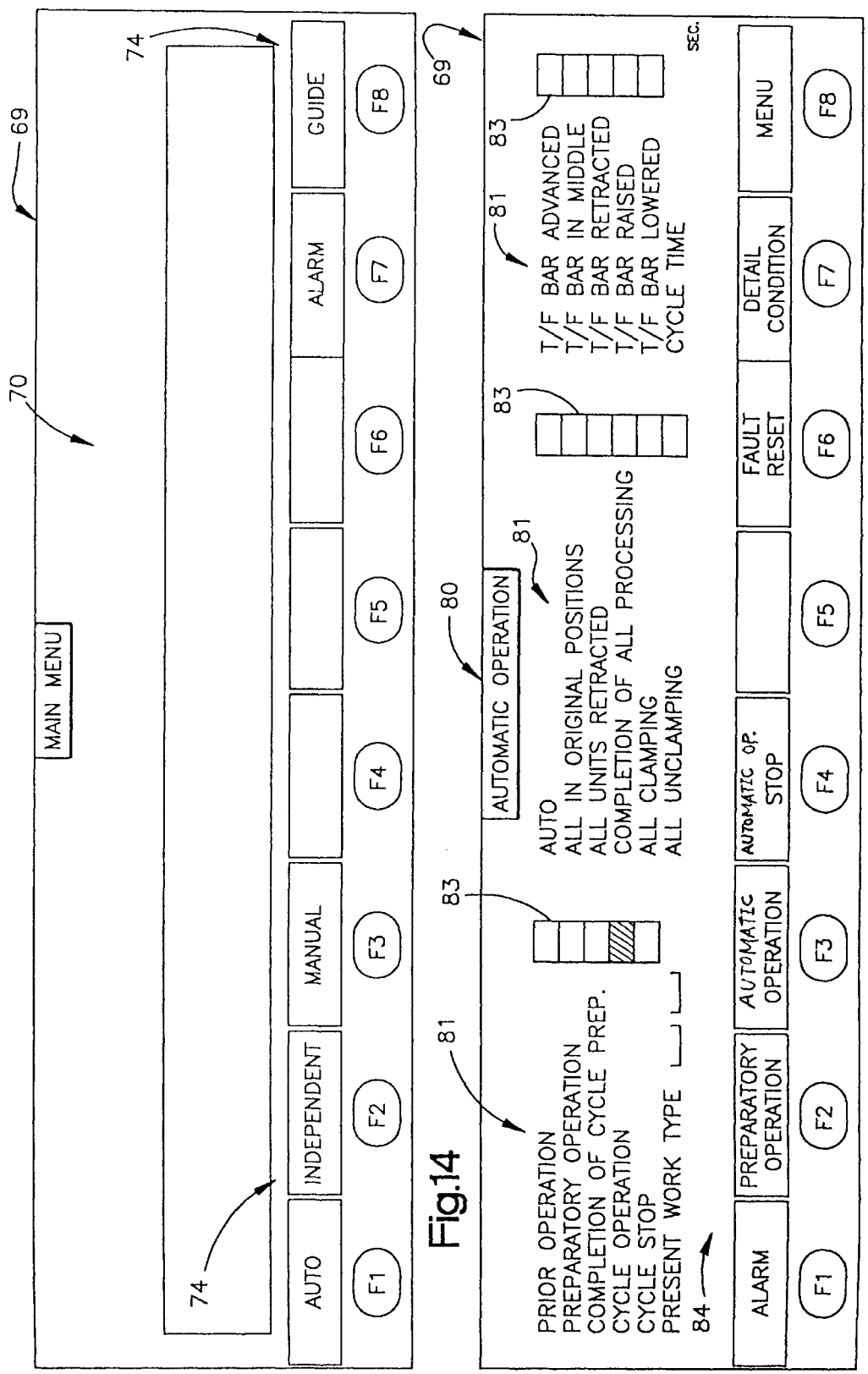

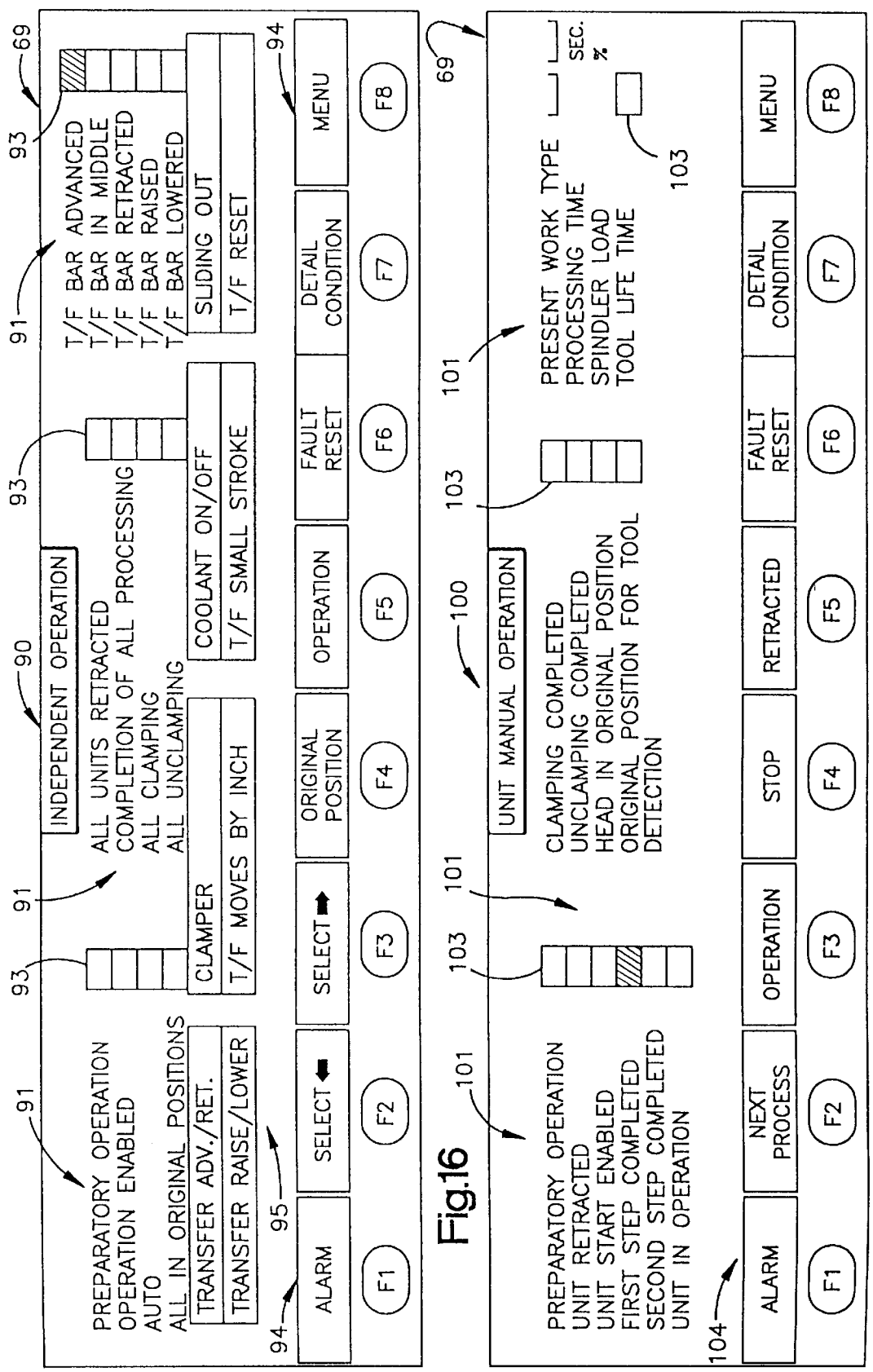

Fig. 23

MEMORY ADDRESS TABLE

| STATUS | SELF-UNIT DATA | OTHER UNIT ACCUMULATION DATA (AND) | OTHER UNIT ACCUMULATION DATA (OR) | ALL UNIT ACCUMULATION DATA (AND) | ALL UNIT ACCUMULATION DATA (OR) |
|---|---|---|---|---|---|
| INSTRUCT PREPARATORY OP. | M2820 |  | M2920 |  | M3020 |
| ENABLE PREPARATORY OP. | M2821 | M2921 |  | M3021 |  |
| COMPLETE PREPARATORY OP. | M2822 | M2922 |  |  |  |
| SELECT AUTOMATIC OP. MODE | M2823 | M2923 |  | M3023 |  |
| INSTRUCT AUTOMATIC OP. | M2824 |  | M2924 |  | M3024 |
| ENABLE AUTOMATIC OP. | M2825 | M2925 |  | M3025 |  |
| SELECT INDEPENDENT OP. MODE | M2826 | M2926 |  |  |  |
| INSTRUCT INDEPENDENT OP. | M2827 |  | M2927 |  | M3027 |
| ENABLE INDEPENDENT OP. | M2828 |  |  |  |  |
| SELECT MANUAL OP. MODE | M2829 |  |  |  |  |
| INSTRUCT MANUAL OP. | M2830 |  |  |  |  |
| ENABLE MANUAL OP. | M2831 |  |  |  |  |
| DEVICE INITIAL POSITION | M2832 | M2932 |  |  |  |
| UNIT RETRACT | M2833 | M2933 |  |  |  |
| COMPLETE MACHINING PROCESS | M2834 | M2934 |  |  |  |
| CLAMPING | M2835 | M2935 |  |  |  |
| UNCLAMPING | M2836 | M2936 |  |  |  | ns ## METHOD AND APPARATUS FOR CONTROLLING A TRANSFER MACHINE

This application is a continuation of application Ser. No. 08/391,426, filed Feb. 16, 1995, now abandoned, which was a CIP of Ser. No. 08/062,931, filed May 17, 1993, abandoned.

BACKGROUND OF THE INVENTION

1. Field of the Invention

The present invention relates to a method and an apparatus for controlling a plurality of automatic machining units provided at a plurality of machining stations of a transfer machine system, respectively.

2. Description of the Related Art

Japanese Examined Utility Model Publication No. 2-32370 discloses a transfer machine system that includes a plurality of unit control panels, each of which includes a sequence control circuit and a power supply, and a plurality of sub-console boxes, which can be operated by an operator in order to control the respective unit control panels. Each of the sequence control circuits is associated with a respective automatic machining unit and transmits an instruction signal to the corresponding machining unit according to a predetermined machining program.

The transfer machine system further includes a main control panel and a main control box as a host computer. The main control panel includes an internal programmable controller that instructs each unit control panel with a predetermined sequence control. The main control box permits the operator to control all the unit control panels via the main control panel. The individual sequence control circuits of the unit control panels are connected with the programmable controller, and data can be mutually transmitted therebetween. Therefore, each of the machining units can be individually controlled by means of the respective sub-control boxes. Further, all the machining units can be collectively controlled by means of the main control box.

In this conventional system, the main control panel gathers data or information transmitted from each of the machining units. The main control panel determines certain matters based on the gathered information, and transmits instructions to the individual unit control panels of the machining units. Therefore, the conventional system requires a relatively long period of time to perform determinations and transmissions of signals (including collecting information and transmitting instructions). This increases the cycle time period of the transfer machine.

The main control panel cannot determine whether the entire system is controllable or not, nor can it adjust the control conditions until all the machining units are set up. Therefore, the installation and the maintenance of the conventional system is troublesome. Furthermore, when some additional machining stations and units are combined with the conventional system, the control program stored in the main control panel must be changed. Therefore, the conventional system is not readily expandable.

Furthermore, according to the conventional system, when an operator collectively controls the machining units via the main control panel, the operator must move to the place where the main control box is located. The larger the system becomes, the more difficult it becomes for the operator to handle it.

SUMMARY OF THE INVENTION

Accordingly, it is a primary object of the present invention to provide a transfer machine control apparatus that has improved operability and facilitates expansion.

To achieve the foregoing and other objects and in accordance with the purpose of the present invention, an improved transfer machine control apparatus for controlling a transfer machine is provided. The control apparatus includes a plurality of working stations between which a work piece is transferred. Each working station is provided with a working unit having an operational device to perform a given working step. The control apparatus includes a plurality of unit controllers corresponding to the working units for controlling an associated operational device during the performance of the working step. A plurality of communication control devices are coupled to the unit controllers, respectively. One or more data buses for connecting the communication control devices to one another and for allowing data communication between the unit controllers are provided. Each of the unit controllers includes the following: 1) a common data memory for storing status data concerning the status of all the working units, the status data being updated based on the status of its own working unit and on the status of the other working units input from the associated communication control device; 2) a program memory for storing a manual operation program to execute a manual operation mode, an independent operation program to execute an independent operation mode, an automatic operation program to execute an automatic operation mode and a preparatory operation program to execute a preparatory operation mode; and 3) drive control means coupled to the common data memory and to the program memory for controlling its own associated operational device based on the status data stored in the common data memory and on a selected operation program in the program memory. Each of the communication control devices supplies data concerning the status of its own associated working unit to the unit controllers of the other working units and receives status data concerning the status of the other working units from the other unit controllers to update the status data stored in the common data memory with the received status data such that all the unit controllers in the transfer machine share common working unit status data.

BRIEF DESCRIPTION OF THE DRAWINGS

The feature of the present invention that are believed to be novel are set forth with particularity in the appended claims. The invention, together objects and advantages thereof, may best be understood by reference to the following description of the presently preferred embodiments together with the accompanying drawings.

FIGS. 1 through 8 show a first embodiment according to the present invention:

FIG. 1 is a block diagram showing a part of control system of a transfer machine according to the present invention;

FIG. 2 is a block diagram showing a part of a control device of the transfer machine;

FIG. 3 is a plan view of the transfer machine;

FIG. 4 is a front view showing display blocks of a operation panel of the transfer machine;

FIG. 5 is a front view showing control blocks of the operation panel of the transfer machine;

FIG. 6 is an explanatory diagram showing the control sequence of the transfer machine;

FIG. 9 is a block diagram showing a part of the control system of the transfer machine; and FIG. 10 is a block diagram showing a part of the control device of the transfer machine.

FIG. 11 is a block diagram showing a part of the control system of the transfer machine of a third embodiment according to the present invention.

FIG. 12 is a block diagram showing a part of the control system of the transfer machine of a fourth embodiment according to the present invention.

FIGS. 13 through 19 show a fifth embodiment according to the present invention:

FIG. 13 is a front view showing an operation panel of the transfer machine;

FIG. 14 is a front view of a display device of the operation panel, and shows a screen display for menu;

FIG. 15 is a front view of the display device of the operation panel, and shows a screen display in an automatic operation mode;

FIG. 16 is a front view of the display device of the operation panel, and shows a screen display in an independent operation mode;

FIG. 17 is a front view of the display device of the operation panel, and shows a screen display in an unit manual operation mode;

FIG. 18 is a front view of the display device of the operation panel, and shows a screen display at the time of the manual control; and FIG. 19 is a front view of the display device of the operation panel, and shows a screen display for operational guides.

FIGS. 20 through 24 show a sixth embodiment according to the present invention:

FIG. 20 is a block diagram showing a part of a control device of a transfer machine;

FIG. 21 schematically shows data communication in a programmable controller as an unit controller;

FIG. 22 is a flowchart of processing procedure;

FIG. 23 is a memory address table illustrating the relationship between data address and status data stored in a memory area of an unit dominated data memory; and FIG. 24 is a flowchart to which the automatic operation program flowchart shown in FIG. 7B is rewritten in a format using sequence address.

DETAILED DESCRIPTION OF THE PREFERRED EMBODIMENTS

The first through seventh embodiments according to the present invention will now be described referring to the accompanying drawings.

First Embodiment

Figure 3:
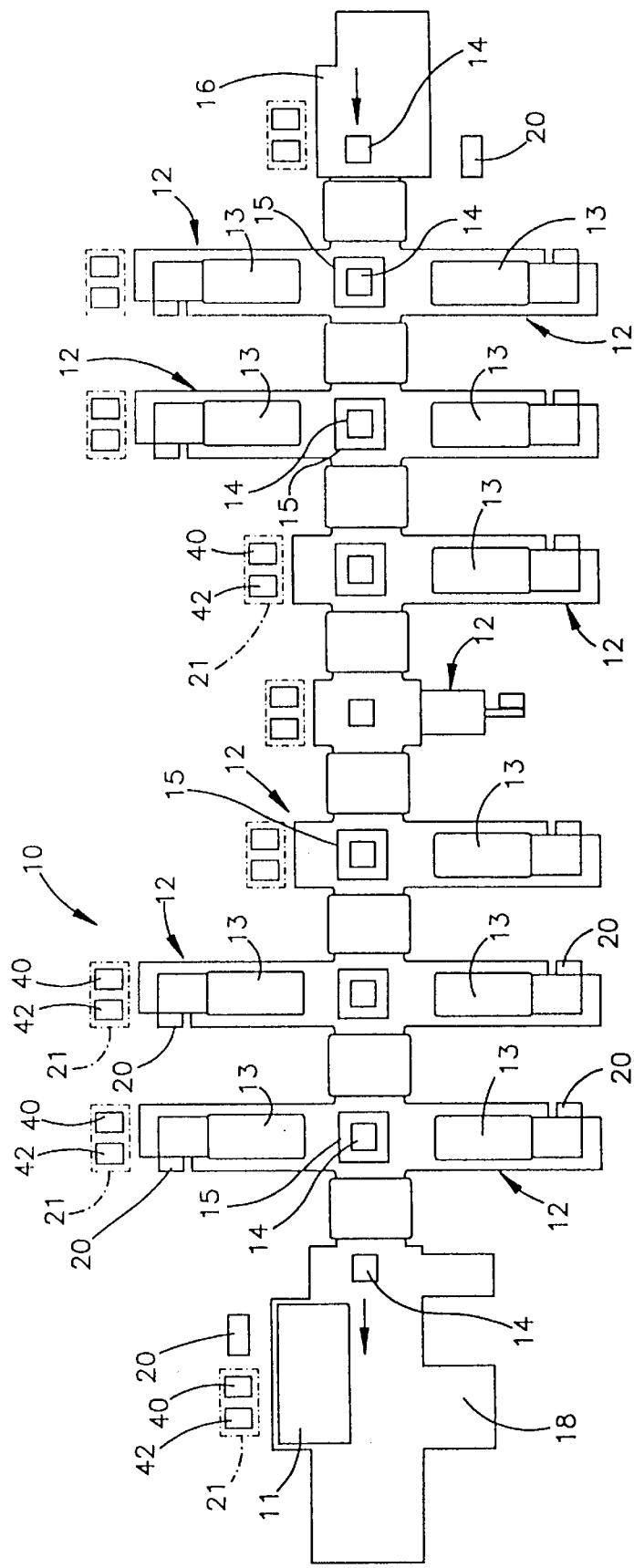

As shown in FIG. 3, a transfer machine 10 comprises a plurality of machining units 12 arranged in a line along the transport direction of a workpiece 14 (right to left direction in FIG. 3). Each of the machining units 12 has a predetermined function suitable to one of the steps among a sequential operating process. Each of the machining units 12 includes one or two machining devices 13 as an operational device or tool, which corresponds to a respective working station, and at least one jig 15 for clamping the workpiece 14.

A loading unit 16 is located at the upstream end of the transfer machine 10 for feeding each workpiece 14 into the transfer machine 10. An unloading unit 18 is provided at the downstream end of the transfer machine 10, for unloading the machined work pieces 14 out of the transfer machine 10. A transfer mechanism including at least one transfer bar (not shown) is provided between the loading unit 16 and the unloading unit 18. Each workpiece 14 is shifted from one process station to the adjacent station, step by step, due to the sequential motion of the transfer bar.

According to this embodiment, a transfer device 11 is provided. The transfer device 11, the machining units 12, loading unit 16, and unloading unit 18 are installed as working units. Each working unit includes an operation panel 20 for instructing the various operations, including the actuation and halting of the device, and a control circuit device 21, which includes various internal circuits.

Figure 4:
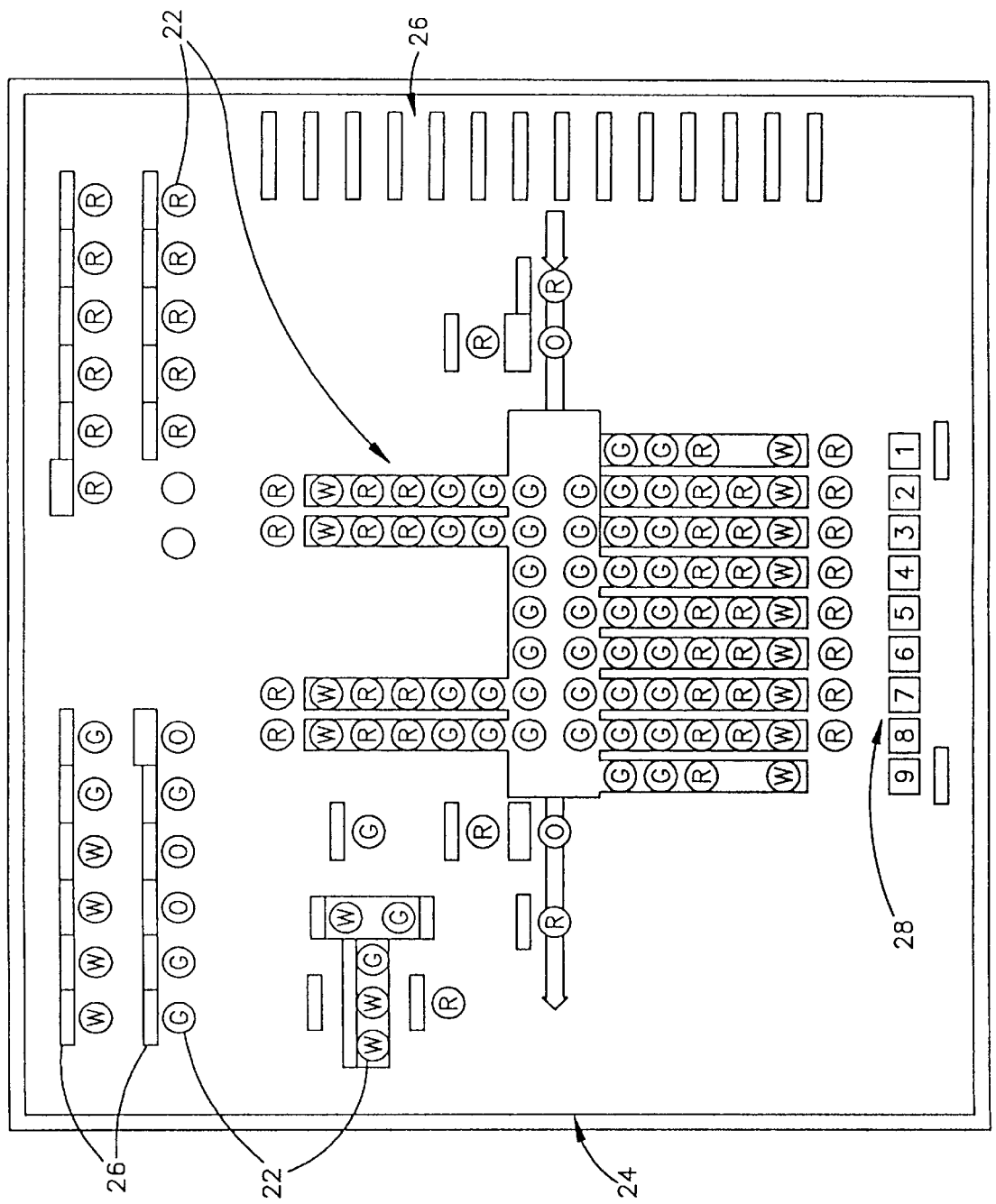

Each operation panel 20 includes a display block 24 as shown in FIG. 4. The display block 24 includes multiple lights 22 which indicate the operational conditions of the corresponding units. The display block 24 further includes message portions 26, each of which indicates the meaning of the respective illuminated lights 22, and display portions 28, each of which indicates the number of the respective stations of the transfer machine 10. The lights 22 and the messages 26 as shown in FIG. 4 can indicate all the operational conditions of the respective machining units 12, the loading unit 16 and the unloading unit 18 of the transfer machine 10. These lights 22 and message portions 26 may be provided at each operation panel 20 of each working unit. Or, each working unit may be provided with the lights and/or the message portions necessary to indicate only its own conditions.

Figure 5:
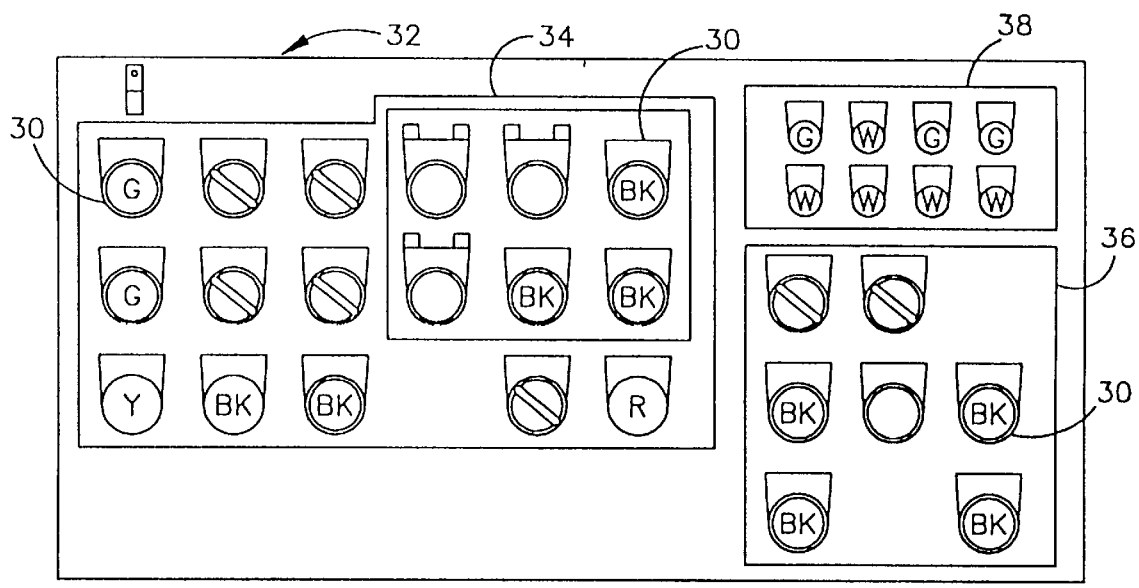
Figure 7A:
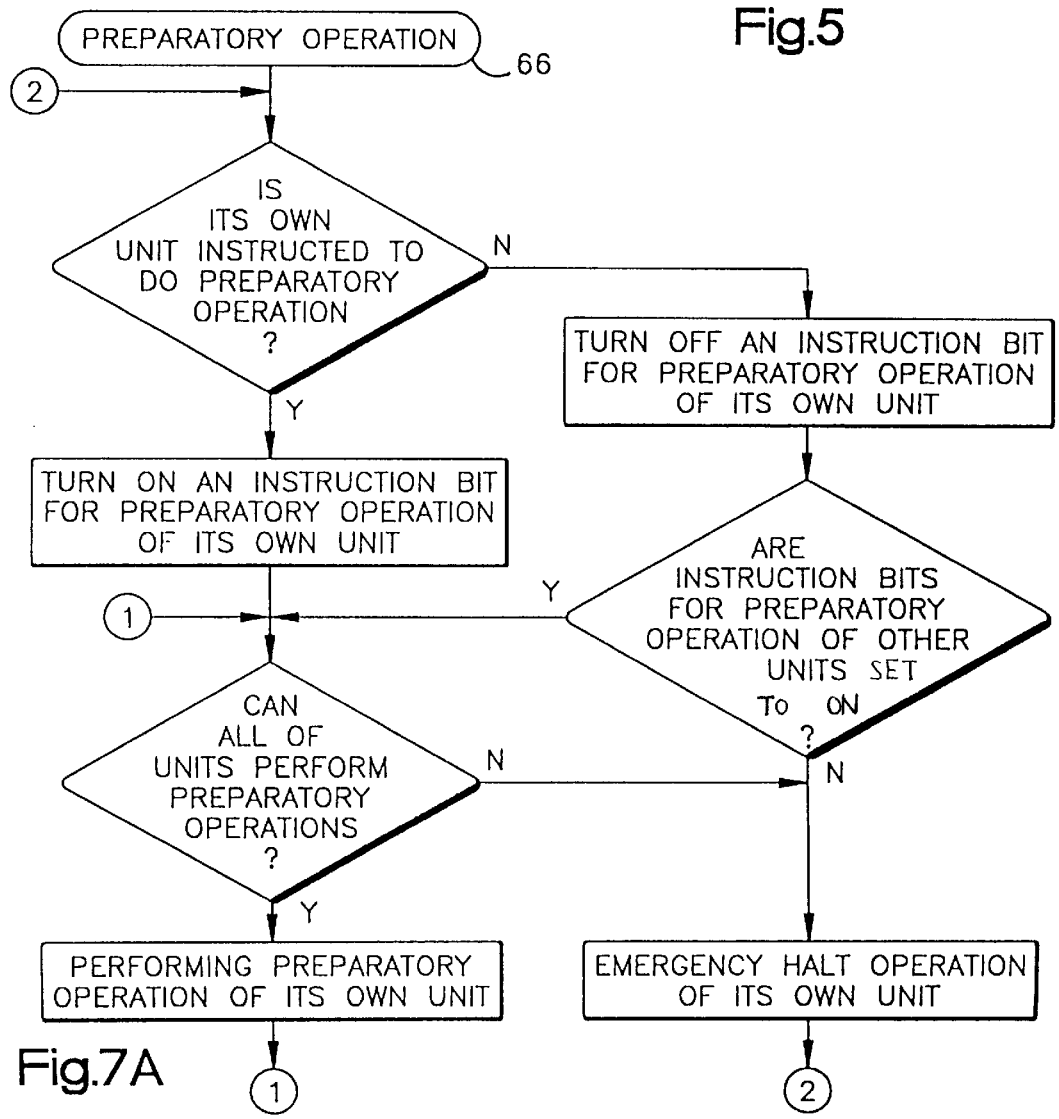
FIG. 7A is a flowchart showing preparatory operation procedure.

Each of the operation panels 20 is provided with an operation block 32 as shown in FIG. 5. The operation block 32 includes many buttons or switches 30 manipulated by an operator for the purpose of initiating the various operations, such as a transfer movement and machining operations.

On each operation block 32 are provided a plurality of common instruction buttons 34 for giving common instructions to the transfer machine 10 such as instructions for performing or starting a preparatory operation, an automatic operation, or an independent operation, and a plurality of individual instruction buttons 36 for individually operating the corresponding working units. For example, a button is provided for instructing a manual operation.

A plurality of indicating lights 38 are provided on each operation panel 20. The lights 38 correspond to the instruction buttons 36. The main body of the operation block 32 and the common instruction buttons 34 of one working unit are similar to those of the other working units. The individual instruction buttons 36 and indicating lights 38 of each working unit differ from those of the other working units. Each working unit can include only the common instruction buttons 34 necessary for its own functions.

Figure 2:
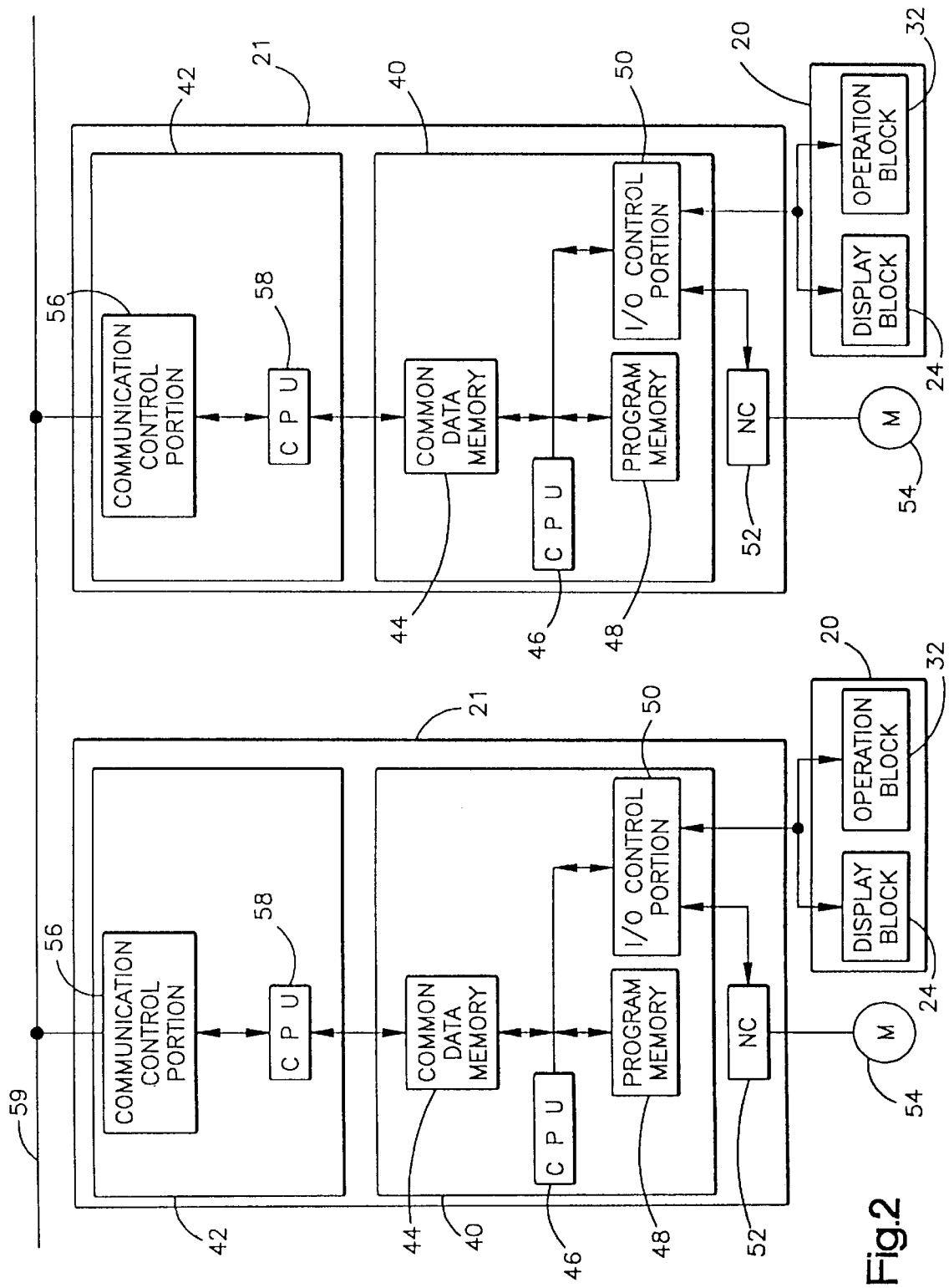

As shown in FIG. 2, the control circuit device 21 of each working unit includes a unit controller 40, such as a programmable controller, for controlling the corresponding working unit, and a communication control device 42 for communicating unit status information between it and the other working units. The unit controller 40 includes a central processing unit (CPU) 46, re-writable common data memory 44, and a program memory 48, which stores the program for controlling the operational procedure of the corresponding working unit. The memories 44 and 48 are generally formed by random access memories (RAMs).

Each unit controller 40 includes an I/O controller 50, which connects it to one or more external devices. The unit controller 40 of a machining unit 12 is connected to an NC controller 52 via the I/O controller 50 so as to control a feed motor 54. Further, the unit controller 40 is connected to the display block 24 via the I/O controller 50 and controls the display block 24 so that it indicates the various operational conditions of the transfer machine.

Furthermore, the unit controller 40 is connected to the operation block 32 via the I/O controller 50 and controls the operational devices or tools (such as the NC controller 52, the jig 15 and the transfer device 11) in accordance with the setting of the buttons 30. In addition, the unit controller 40 controls indications in the display block 24. The common data memory 44 stores the unit status information of the other working units as well as that of the corresponding working unit.

Each of the communication control devices 42 includes a communication control portion 56, which transmits the unit status information to the other, working units and receives it from the other working units, and a CPU 58, which controls the data communication between the communication control portion 56 and the common data memory 44. The communication control device 42 loads the unit status information from the communication control portions 56 of the other working units, through a communication line 59 as a data bus, according to a predetermined communication standard. The communication control device 42 allows the common data memory 44 to replace old unit status information or data stored therein with new data. In addition, the control device 42 outputs the newest status information concerning its corresponding working unit to the line 59.

Figure 1:
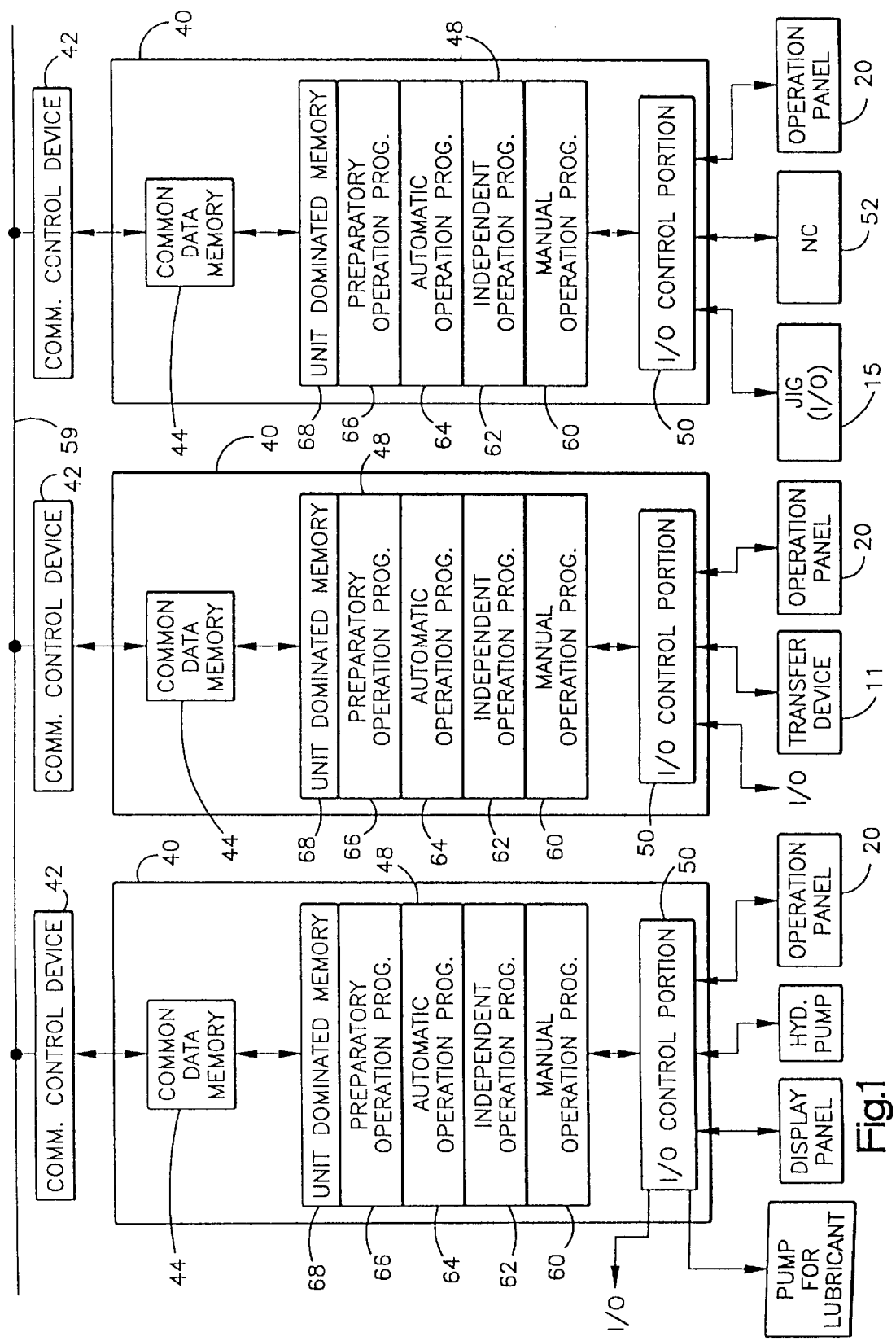

As shown in FIG. 1, each program memory 48 of the unit controllers 40 stores a manual operation program 60, an independent operation program 62 and an automatic operation program 64. The manual operation program 60 is used to independently and manually operate the corresponding working unit. The independent operation program 62 is used for causing a specific working unit to execute a predetermined operation or for causing all the working units to execute a predetermined common operation. The automatic operation program 64 is used for operating all the working units with a cycle operation (i.e., repeatedly executing the same operation). According to the automatic operation program 64, one working unit is controlled simultaneously with the other working units such that the transfer machine 10 can continuously perform the sequential machining operation.

Further, each program memory 48 stores a preparatory operation program 66 for causing a working unit to be operable. The preparatory operation program 66, automatic operation program 64, and independent program 62 in one unit controller 40 are the same as those in the other unit controllers 40. Each of the program memories 48 of the respective working units includes a memory or region 68 provided for its own working unit (hereinafter referring to as "unit dominated memory 68"). The unit status information or data necessary for each working unit is selected or picked up from the corresponding common data memory 44 and the selected data is stored in the corresponding unit dominated memory 68.

Each common data memory 44 stores the unit status information or data about all the working units including its own working unit. The unit status information or data in one common data memory 44 is always updated with the newest information received from the other working units by means of the communication control unit 56. As a result, all the common data memories 44 of the unit controllers 40 always store common unit status information about all the working units of the transfer machine.

Figure 6:
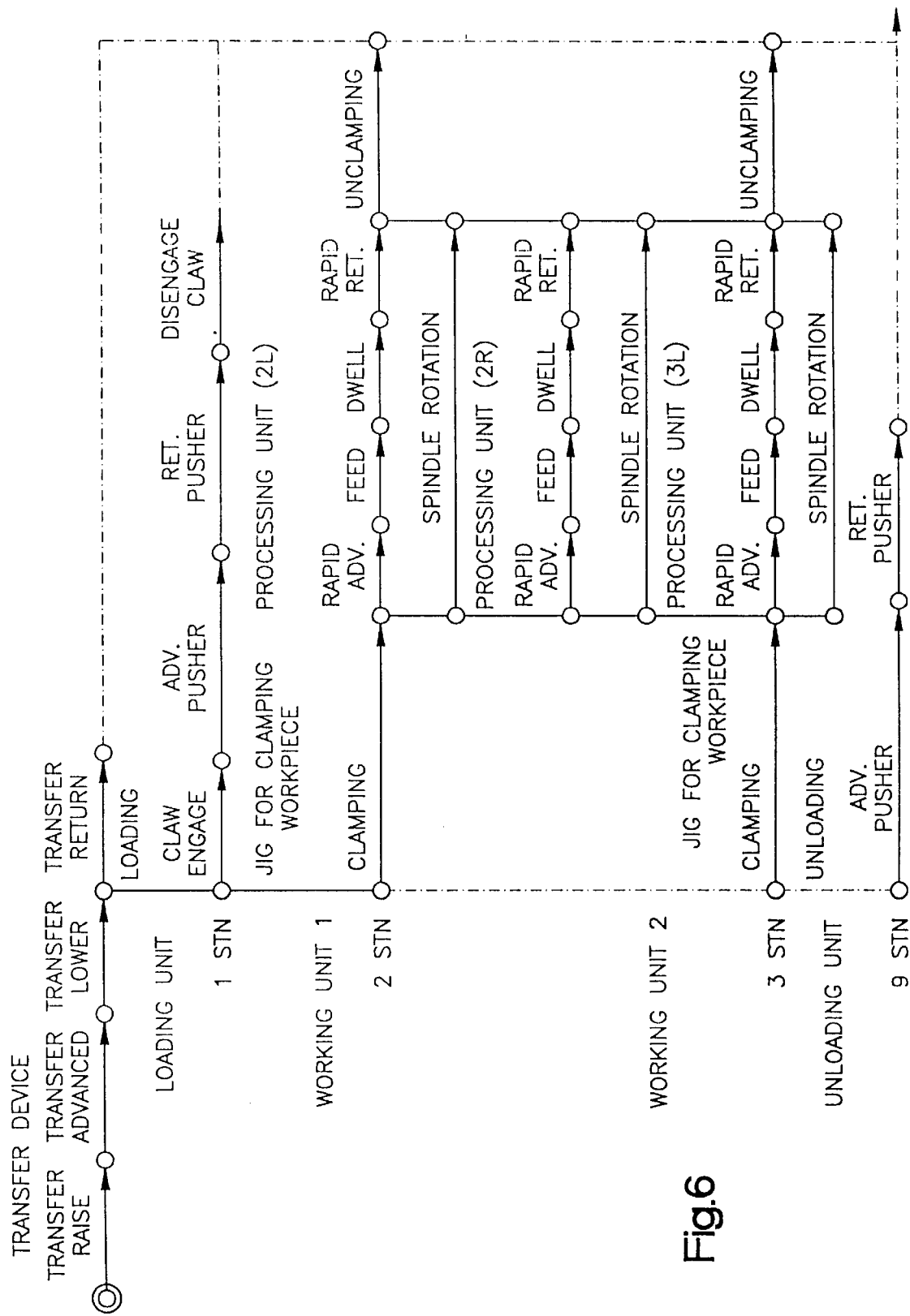

The operation of the transfer machine according to this embodiment will now be described. The transfer device 11 moves along the transfer machine 10, as in conventional machines, according to the chart shown in FIG. 6. The workpiece 14 is transferred from one station to the other station, due to the actions of raising, forwarding and lowering of a transfer bar.

When the workpiece 14 is transferred toward the next station by lowering the transfer bar, a claw of the loading unit 16, which is engagable with the workpiece, rotates in one direction to load a new workpiece 14 onto the end of the transfer bar. At the next step, a new workpiece 14 is pushed toward the transfer bar by means of a pusher. Then, the pusher is retracted, and the hook is reversely rotated. Thus, the loading unit 16 is ready for loading a new workpiece 14.

Each of the jigs 15 of the respective machining units 12 clamps the newly provided workpiece 14 in synchronism with the lowering of the transfer bar to perform a predetermined machining process on it. Then, the machining device 13 is forwardly moved by the rotation of the feed motor 54 while a main shaft motor provided in each machining device 13 rotates. After the machining device 13 has performed the machining operation on the workpiece 14, the feed motor 54 causes the machining device to be returned to an original position. After the main shaft motor is stopped, the clamping position of the jig 15 is released. Further, the workpiece 14 processed with the sequential machining operations is sent out from the transfer machine 10 by means of an operational device or tool, such as a pusher, at the unloading unit 18, at the same time the transfer bar is lowering. The lights 22 of the display block 24 indicate the operational states of the individual working units at the sequential machining steps.

The control sequence of the transfer machine will now be described referring to FIG. 1, and the flowcharts in FIGS. 7A, 7B, 8A and 8B. All the matters described hereinafter (e.g., determination and setting) are carried out based on the unit status information or data stored in each of the common data memories 44 of the working units. The selections or instructions described below about each working unit originate from the operations in each control panel.

When an operator starts the preparatory operation by pushing a button among the common instruction buttons 34 in any one of the operation panels 20 of the working units, the execution of the preparatory operation program 66 is started at the working unit. According to the preparatory operation program 66 as summarized in FIG. 7A, the CPU 46 determines whether or not the start of the preparatory the operation is instructed at its own working unit. When the preparatory operation is instructed, the CPU 46 turns ON a data bit concerning preparatory operation in the common data memory 44 of the working unit. Further, the data bits concerning the preparation for operation stored at the corresponding addresses in the common data memories 44 of the other working units are also turned ON based on the communication through the communication line 59.

When a working unit does not receive a preparatory operation instruction, the working unit turns OFF the data bit thereof concerning the preparatory operation in its own common data memory 44 and determines if any data bit concerning the preparatory operation for other working units is set ON or not by referring to its own common data memory 44. If its own or any one of the other data bits concerning the preparatory operation is set ON, the working unit determines whether it and all other units can execute preparatory operations by referring to the unit status data in the common data memory 44. When preparatory operation is possible in all other units, the working unit starts its own preparatory operation.

Thus, the preparatory operation program 66 is executed in each of the other working units so that all of the working units start preparatory operation. When preparations at every working unit are completed, a data bit provided in each common data memory indicating whether the preparatory operations of the working units are completed is set ON. The preparatory operation will not be executed if the data bits concerning preparatory operation at all the working units are set OFF or if any one of the working units is not ready for preparatory operation.

Unless an emergency stop is instructed in each working unit, the transfer machine can be operated in any one of the automatic operation mode, the independent operation mode, or the manual operation mode, as described below. On the other hand, when the emergency stop is instructed in any one of the working units, all the working units execute the emergency stop operation.

Figure 7B:
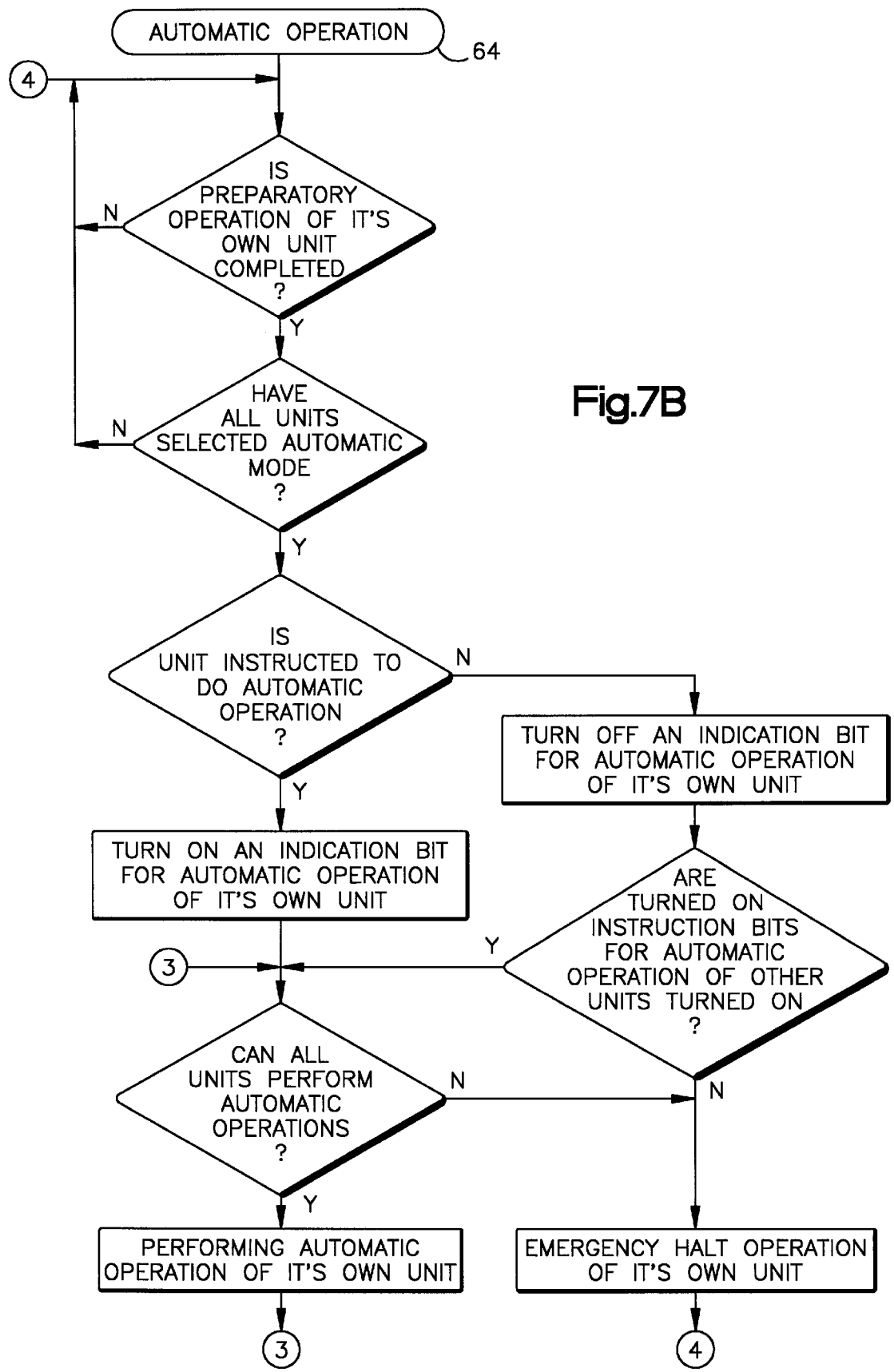
FIG. 7B is a flowchart showing control procedure under an automatic operation mode.

According to the automatic operation program 64 as summarized in FIG. 7B, the CPU 46 in each working unit determines whether all the working units, including its own, have selected the automatic operation mode on the basis of the unit status information stored in the common data memory 44 when its own data bit concerning preparatory operation is set ON.

When all the working units select the automatic operation mode, each CPU 46 confirms whether its own working unit has been given an automatic operation instruction. If so, the CPU 46 sets ON the automatic operation indication bit at a given address in its own common data memory 44. Simultaneously, the automatic operation indication bits at the corresponding addresses in the common data memories of all the other working units are set ON.

When the automatic operation instruction is not given to the working unit, the CPU 46 sets OFF the automatic operation indication bit in its own common data memory 44. The CPU 46 determines whether or not the other working units have been given the automatic operation instructions according to the unit status information stored in its own common data memory 44. When the automatic operation instruction is set in any one of the working units, the CPU 46 determines whether or not all of the working units are operable in the automatic operation mode. When the determination of the CPU 46 is YES, its own common data memory 44 stores the automatic operation bit data indicating "ON". In addition, the common data memories 44 of the other working units also store the automatic operation bit data indicating "ON".

Similarly, all the other unit controllers 40 execute automatic operation programs in the same manner. Consequently, each of the working units enters an automatic operation mode and starts executing the automatic operation. When any one of the working units has not received the automatic operation instruction and if any one of the working units is not ready for the automatic operation, each working unit fails to start an automatic operation and executes the halt operation so as to halt the automatic operation.

Figure 8A:
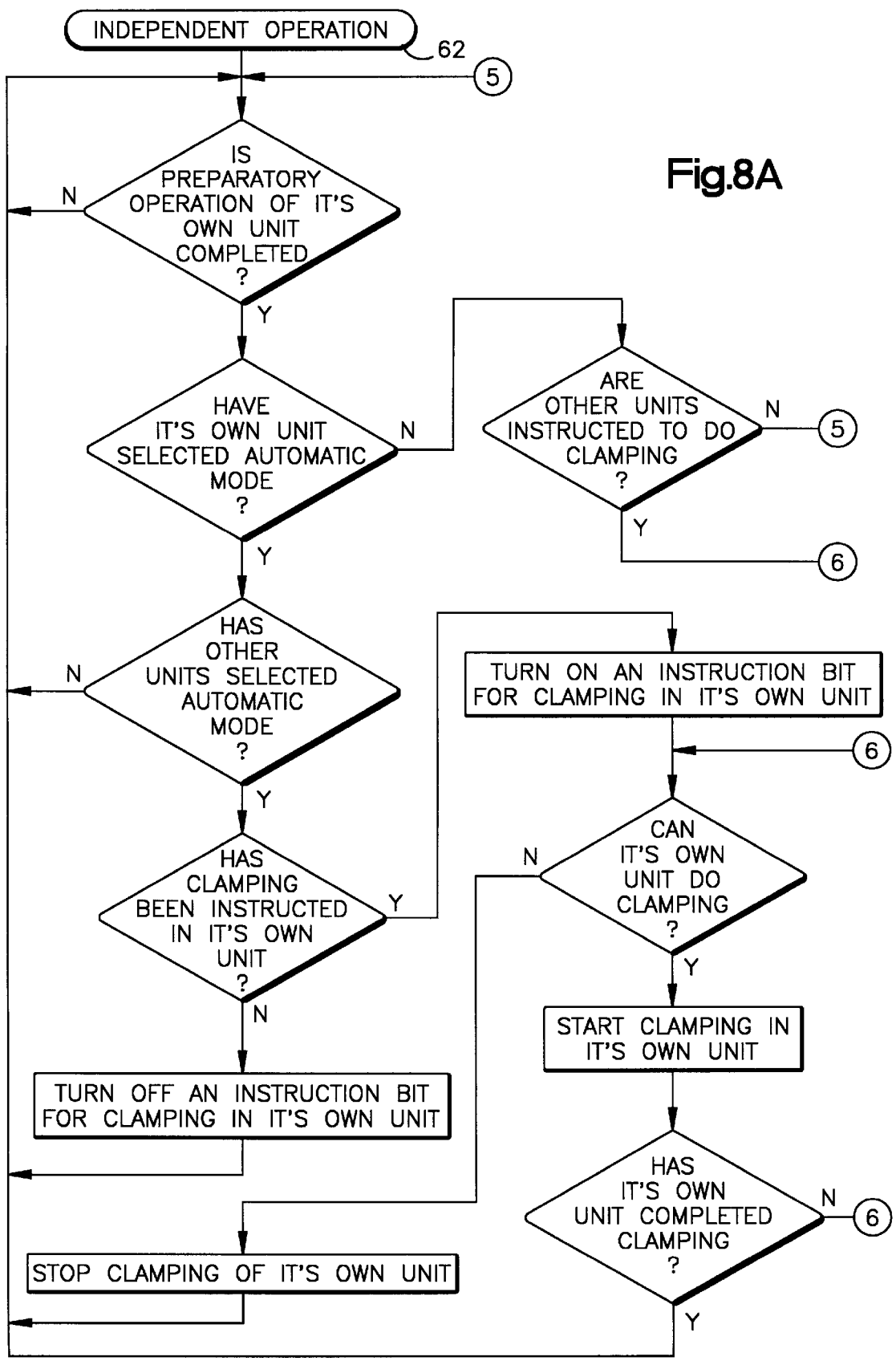
FIG. 8A is a flowchart showing control procedure under an independent operation mode.

According to the independent operation program 62 as summarized in FIG. 8A, the CPU 46 determines whether its own working unit has selected the independent mode by referring to the unit status information stored in the common data memory 44 when the data bit concerning preparatory operation at its own working unit is set ON.

If the independent operation mode is selected, the CPU 46 determines whether or not the other working units have selected the automatic operation mode. When all the other working units select the automatic operation mode, the CPU 46 determines whether or not a given independent operation (e.g., clamping) is instructed. The CPU 46 sets ON or OFF a bit in its common data memory 44 in accordance with the determination of whether the instruction exists or not.

When independent operation is instructed, the CPU 46 determines whether or not its own working unit is able to carry out the expected operation in the independent operation mode.

When the determination is YES, the common data memory 44 of its own working unit holds an independent operation data bit indicating "ON" at a given address. Additionally, independent operation data bits, at the corresponding addresses in the common data memories 44 of the other working units, indicate "ON".

Similarly, independent operation programs are executed at the other unit 40 so that the working units having the independent operation bit indicating "ON" start executing the independent operations (e.g., clamping), respectively. When a working unit cannot execute its own independent operation, the independent operational mode is suspended at the working unit.

When a working unit selects the automatic operation mode, the CPU 46 determines whether or not an independent operation instruction originating from any one of the other working units has been received. When the independent operation instruction exists, the CPU 46 determines whether or not its own working unit is able to execute the independent operation. Based on the determination, the working unit starts executing the independent operation and the other working units also start executing the independent operations.

Figure 8B:
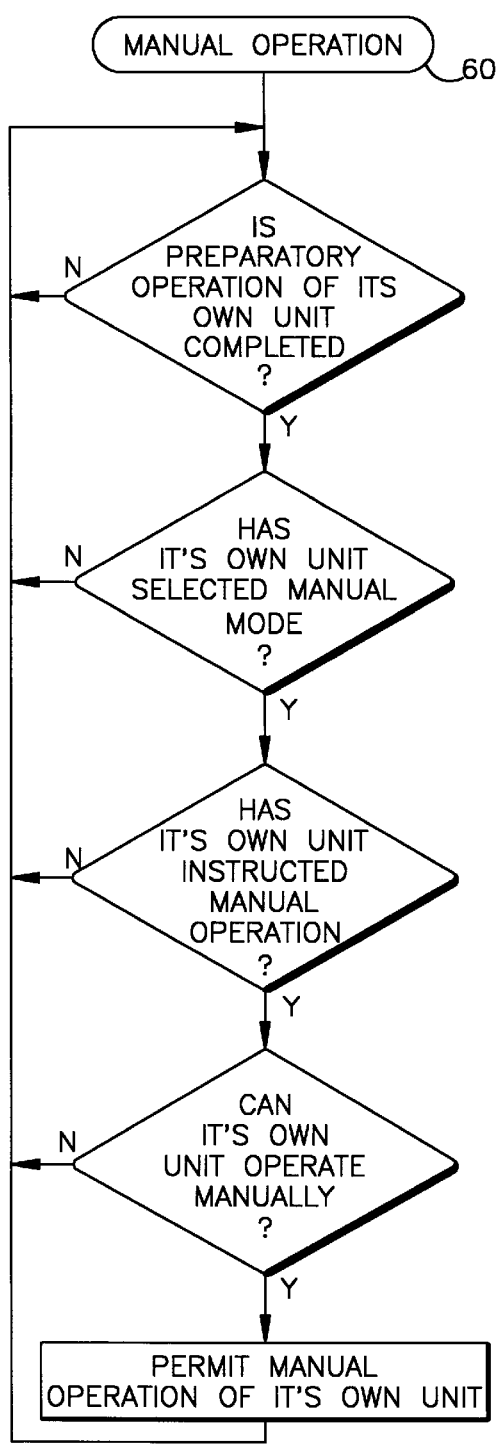
FIG. 8B is a flowchart showing control procedure under an unit manual operation mode.

According to the manual operation program 60 as summarized in FIG. 8B, the CPU 46 determines whether its own working unit has selected the manual operation mode. When the manual operation mode is selected, the CPU 46 further determines whether or not the manual operation has been instructed in its own working unit. When manual operation has been instructed, the working unit executes the manual operation.

Each of the unit controllers 40 of the working units has a similar structure and stores a similar control program. Accordingly, any one of the working units may be provided with an operation instruction device for transmitting certain unit status information to instruct another working unit to execute an expected operation.

The operation instruction device transmits some commands concerning controlling the transfer bar to execute a predetermined operation, controlling the hydraulic pressure in a hydraulic system, and unloading workpieces by means of the unloading unit 18 as the unit status information.

In response to the input of such commands, each unit controller 40 determines whether or not the command is directed to its own unit. If so, the controller 40 controls the corresponding operational device or tool to execute the expected operation according to the command. A certain working unit can be selected to execute the expected operation at any one of the operation panels 20. This improves the work efficiency and increases the expandability of the system.

The unit status data in each common data memory includes the data bits concerning various operational instructions to individual working units. According to the preparatory, automatic, and independent operation programs, each controller sets to ON its own operation instruction data bit when receiving an operation instruction to its own working unit and operates based on the operation instruction bit data of the other working units when no operation instruction to its own working unit have been received. This allows the communication of operational instructions between one working unit and the remaining working units. In other words, an operator can manipulate any working unit by using one selected working unit. Consequently, each of the working units can perform the preparatory, automatic, independent and manual operations by referring to operational instruction data at its own and other working units.

According to the transfer machine of this embodiment, each working unit includes the unit controller 40 and the communication control device 42 for performing the respective operations. Therefore, each working unit can achieve instructed operations in accordance with operational programs stored in its own unit based on a determination of the unit status information relating to its own and the other working units, which is stored in its own common data memory 44. As a result, data processing speed is increased, the cycle time of the transfer machine is shortened, and the machining time for the workpiece is reduced significantly. This system requires no main controller as is required by conventional systems.

According to a conventional collective control system employing a conventional main control panel as a host computer, the unit status information about all the working units is gathered in a memory of the main control panel. A control device in the main control panel makes determinations based on the gathered information. Then, the unit status information is sent to the respective unit control panels from the main control panel. Accordingly, the conventional system requires much longer periods of communication time and determination time for gathering the unit status information of the individual units, making determinations based on the gathered information, and transmitting the determination results to all the working units.

According to this embodiment, each of the working units always receives the unit status information from the other working units and can independently determine the various conditions. In other words, the present system loses only the data transmission time that it takes for all the working units to receive the newest unit status information. Therefore, the required total time for communication and determination by the present transfer machine is approximately one half of the time required by conventional systems.

According to the present invention, it is easy to increase additional working units in a transfer machine system because each additional unit controller 40 is formed by combining a common data memory and a program memory, which are previously prepared, with a specific manual operation program for its unit only. It is relatively easy to connect such additional unit controllers 40 to the data bus, which forms a looped communication system. The deletion of a unit controller 40 from the looped system will produce a new transfer machine system having a reduced number of working units. In that case, the unit status data for the deleted working unit is not written to data areas assigned to the deleted unit at individual unit controllers linked to one another. Consequently, in this transfer machine system, it is not necessary to prepare any new sequential programs or to increase or decrease any memory addresses at each memory. This facilitates the addition of a working unit to the system or the deletion of a working unit from the system making system design much easier.

Second Embodiment

Figure 9:
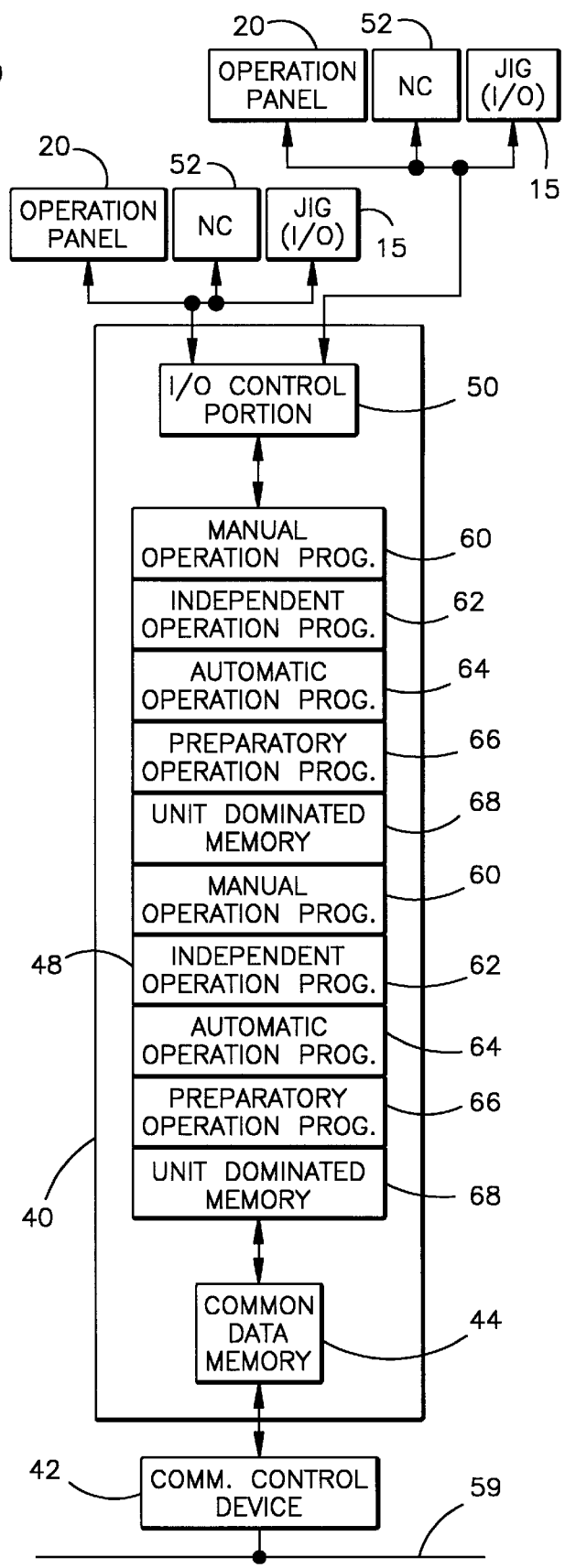
FIGS. 9 and 10 show a second embodiment according to the present invention.
Figure 10:
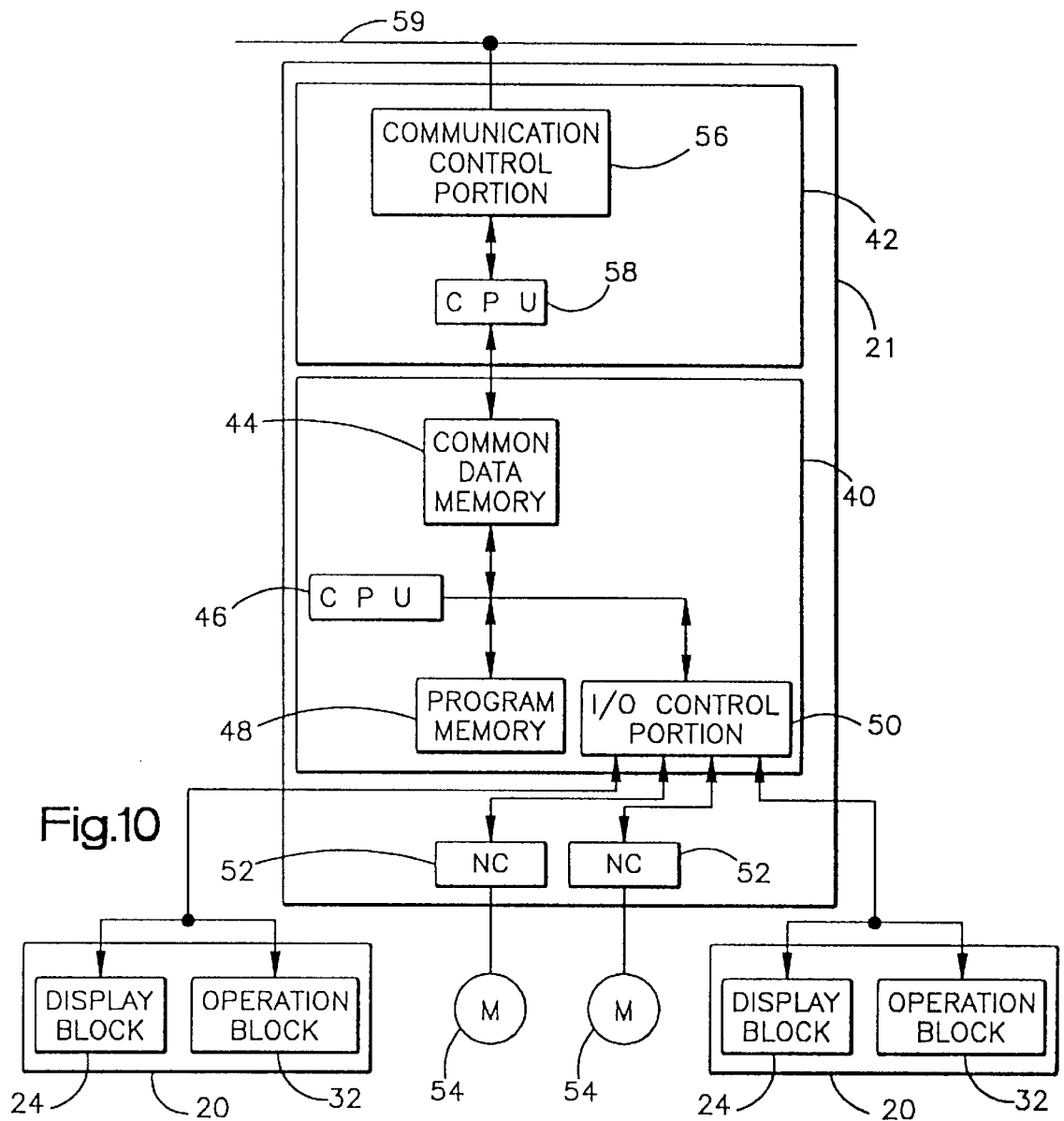

The second embodiment according to the present invention will now be described referring to FIGS. 9 and 10. The elements corresponding to those in the first embodiment are given similar reference numerals.

In the second embodiment, two adjacent working units are controlled by a single unit controller 40. Therefore, the communication control device 42, paired with the controller 40, is also commonly utilized. However, the program memory 48 of the controller 40 includes two sets of programs used for the individual working units. Each program set comprises a manual operation program 60, an independent operation program 62, an automatic operation program 64 and a preparatory operation program 66. The programs 62, 64 and 66 are common at each working unit. The program memory further includes two unit dominated memories 68 associated with the two working units, respectively. The CPU 46 is connected to two working units to control them via a single I/O control portion 50.

The single controller 40 can individually control multiple working units within the control ability of the CPU 46. According to the second embodiment, as in the first embodiment, each of the working units is individually controlled in the distributed control manner based on the information stored in the common data memories 44. In this manner, the unit controllers 40 are efficiently utilized. The cost of planning (or setting up) and maintenance of a manufacturing system can be reduced. Further, the space that the System occupies is more efficiently utilized. In addition, the number of the communication control devices 42 can be reduced improving the efficiency of data communication.

Third Embodiment

The third embodiment according to the present invention will now be described referring to FIG. 11. The elements corresponding to those in the first embodiment are given similar reference numerals.

Like the second embodiment, two adjacent working units are controlled by means of a single unit controller 40.

The communication control device 42, and the CPU and the common data memory 44 of the unit controller 40 are commonly utilized. Further, the two working units commonly utilize a single manual operation program 60, independent operation program 62, automatic operation program 64, and preparatory operation program 66, which are stored in the program memory 48. The manual operation program 60 has two programs for the respective two working units. The independent, automatic and preparatory operation programs 62, 64 and 66 are common at each working unit.

However, two unit dominated memories 68, associated with the respective two working units, are provided in the program memory 48. The controller 40 includes a single I/O control portion 50 connected to the two working units.

According to the third embodiment, as in the first embodiment, each of the working units is individually controlled in the distributed control manner based on the information stored in the common data memories 44. This arrangement uses the program memory 48 efficiently, and in addition, gains the advantages mentioned with respect to the second embodiment. This arrangement is beneficial for a transfer machine having a lot of working units machining workpieces while consecutively transferring the workpieces from a preceding machining station to a subsequent machining station where all the machining programs are substantially similar.

Fourth Embodiment

The fourth embodiment of the present invention will now be described referring to FIG. 12. The elements corresponding to those in the first embodiment are given similar reference numerals.

As in the second and third embodiments, a single unit controller 40 controls two working units. Therefore, the communication control device 42, and the CPU and the common data memory 44 of the unit controller 40 are commonly utilized. However, in this embodiment, two working units adjacent to each other commonly utilize a single jig 15. Each of the working units includes a NC controller 52. The two NC controllers 52 are arranged to face each other.

Each NC controller 52 commonly utilizes the manual operation program 60, the independent operation program 62, the automatic operation program 64 and the preparatory operation program 66 stored in the program memory 48 of the unit controller 40. The manual operation program 60 includes two programs for the respective two working units. The independent, automatic and preparatory operation programs 62, 64 and 66 are common to the two working units.

Two unit dominated memories 68 corresponding to the respective NC controllers 52 are provided in the program memory 48. Further, the controller 40 includes a single I/O controller 50 coupled to the two working units. According to the fourth embodiment, each of the working units, including the NC controllers 52, is individually controlled in a distributed control manner based on data stored in the common data memories 44 as in the first embodiment.

According to the second, third and fourth embodiments, one or more working units are controlled by a single unit controller. That is, one unit controller is used by two working units opposite to each other in a station or by two working units provided at two neighboring stations. This arrangement reduces the number of the unit controllers to be provided in a transfer machine. Since common data memories and preparatory, automatic, and independent operation programs are common to all working units, a unit controller 40 can be easily formed by combining such common data memory and common programs with a unit dominated memory and a manual operation program prepared specifically for that unit controller.

During manual operation mode, even when an operator standing by a working unit wants to operate another working unit, the operator does not need move to the other unit to operate it. This releases the operator from the task of walking around the transfer machine.

Fifth Embodiment

The fifth embodiment of the present invention will now be described referring to FIGS. 13 through 19. The elements corresponding to those in the first embodiment are given similar reference numerals.

Figure 13:
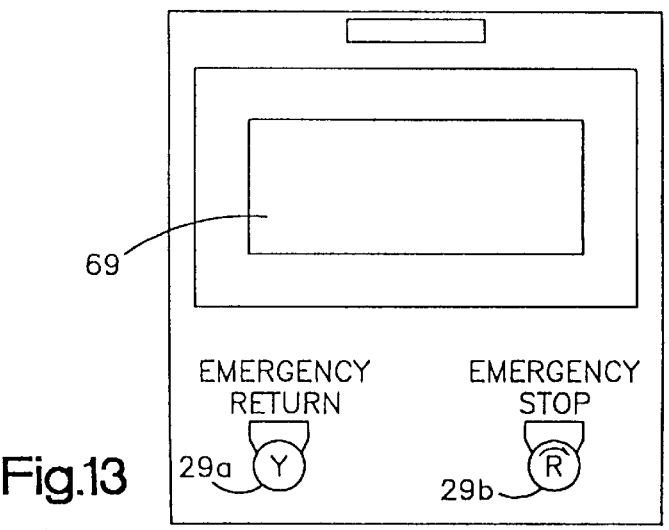

The fifth embodiment relates to a transfer machine similar to that of the first embodiment. As shown in FIG. 13, the unit operation panel 20 includes a display device 69 such as a CRT or a liquid-crystal panel and a display control device (not shown) for controlling the screen display.

The display device 69 has an emergency return button 29A and an emergency stop button 29B formed by pressable buttons and displays function keys F1 through F8, which are touch switches disposed in the lower area of the display screen. The function keys F1 through F8 are used to control the various menus displayed on the screen of the display device 69, which will be described later. The emergency return button 29A is used to return each working unit to a retracted position when the cycle operation is executed. The emergency stop button 29B is used to stop the operation of the manufacturing system as well as to suspend the entire functions of every device including the hydraulic device.

The screen display of the display device 69 is controlled by the display control device. FIG. 14 shows a menu display or screen 70 of the display device 69. The menu display 70 displays the operation menus which the operator requires. FIGS. 15 through 19 show examples of screen displays selectable by the operator and the variable display contents thereof.

Figure 18:
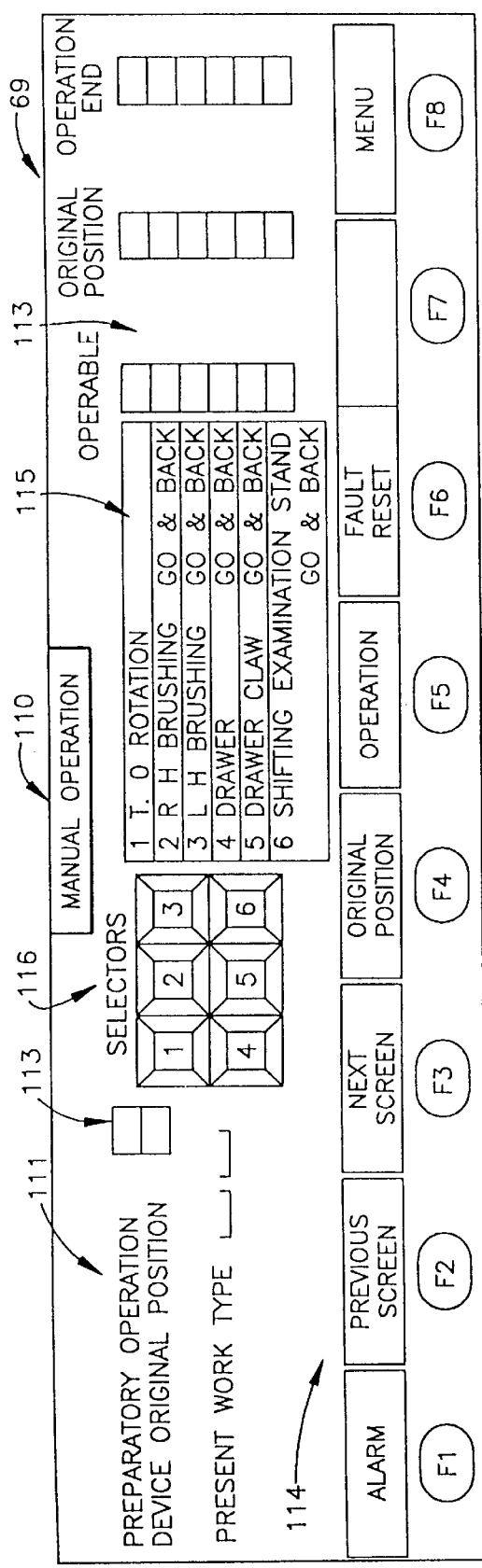
Figure 19:
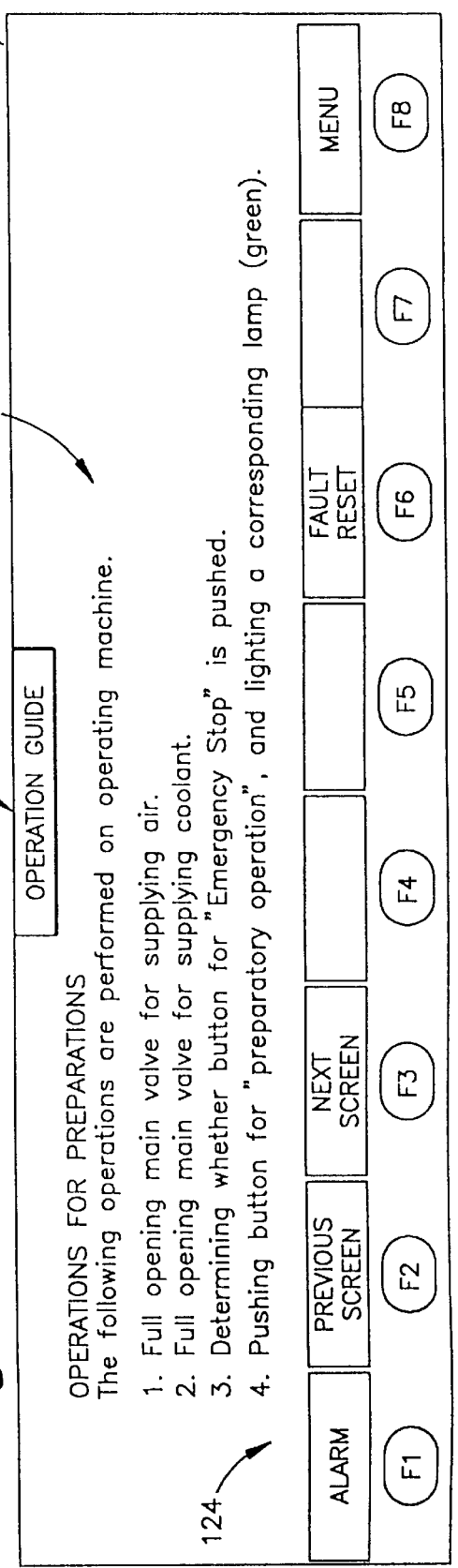

FIG. 15 shows a display or screen 80 utilized when the transfer machine 10 is to be operated in the automatic operation mode. The display 80 is hereinafter referred to as an automatic operation mode display 80. FIG. 16 shows a display or screen 90 utilized when the transfer machine 10 is to be operated in an independent operation mode where various operations are grouped in accordance with the operation contents. The display 90 is hereinafter referred to as an independent operation mode display 90. FIG. 17 shows a display or screen 100 utilized when the transfer machine 10 is to be operated in a unit manual operation mode to enable each working unit to be manually and independently operated. The display 100 is hereinafter referred to as an unit manual operation mode display 100. FIG. 18 shows a display or screen 110 utilized when the unloading unit 18 is to be independently operated. The display 110 is hereinafter referred to as a single operation mode display 110. FIG. 19 shows an operation guide display 120.

The menu display 70 will be switched to another display by pressing any one of the function keys (e.g., F1 through F3), which correspond to the indications at the function display section 74 of the menu display 70. The contents of individual menus will now be described.

As shown in FIG. 15, the automatic operation mode display 80 for the cycle operation includes message sections 81 and display sections 83. The message sections 81 describe the various conditions of the transfer machine 10 when it is in cycle operation or at just before or after cycle operation. The display sections 83 become luminous to indicate if the transfer machine 10 is in a condition which corresponds to one of the statements in the message sections 81. A function display section 84 is disposed at the lower portion of the display screen. The function display section 84 indicates the operation menu of the automatic operation mode, which corresponds to the respective function keys F1 through F8.

In this case, when the operator presses the function key F1, a warning alarm is activated. When the function key F2 is pressed, the transfer machine 10 starts the preparation operation in response to the instruction input by the key F2 so that a hydraulic pump and a pump for lubricant are activated. When the function key F3 is pressed, the cycle operation is initiated for performing a continuous sequence processing in response to the instruction input by the key F3. When the function key F4 is pressed, the cycle operation is stopped. As described above, the function keys F3 and F4 form operational means for the cycle operation. When the function key F6 is pressed, the transfer machine 10, whose operation has been stopped by an abnormal condition, will be reset to an initial condition. When the function key F7 is pressed, the current condition of the system will be displayed on the screen of the display device 69 in detail. When the function key F8 is pressed, the menu display 70 will be called back.

In the independent operation mode, one part of the sequential operation of the transfer machine 10 will be executed by a specific working unit or by some working units that cooperate mutually. As shown in FIG. 16, the independent operation mode display 90 includes display sections 93 and message sections 91 that describe the various conditions of the transfer machine 10 during the execution of the independent operation or just before or after the independent operation execution. A function display section 94 is disposed at the lower portion of the display screen and indicates the operation menu of the independent operation mode, which corresponds to the respective function keys F1 through F8. Further, an independent operation display section 95 is disposed at the center of the display and indicates the contents of independent operations in the independent operation mode. The unit controller 40 executes a specific independent operation indicated by a cursor on the screen.

When the function key F1 is pressed by the operator, a warning alarm is activated. When either function key F2 or F3 is pressed, the cursor in the independent operation display section 95 will be shifted in one of the directions indicated by arrows in response. When the cursor reaches the right end of the display, the cursor will shift from the upper right corner to the lower left corner. When the cursor reaches the left end, the cursor will shift from the lower left corner to the upper right corner. When the function key F4 is pressed, the operation is forced to return to the selected independent operation by the cursor and the operational tools or devices are returned to their initial positions (original positions) in the independent operation mode. When the function key F5 is pressed, the independent operation selected by the cursor will be initiated in response to the instruction input by the key F5. The functions corresponding to the respective function keys F6, F7 and F8 are similar to those in the automatic operation mode display 80.

In a unit manual operation mode, each of the machining units 12 independently performs the required operation. As shown in FIG. 17, the unit manual operation mode display 100 includes display sections 103 and message sections 101, which describe the various condition of the transfer machine 10 when the transfer machine 10 is in an unit manual operation or just before or after it. A function display section 104 is displayed at the lower portion of the screen and indicates the operation menu of the unit manual operation mode, which corresponds to the individual function keys F1 through F8. The unit controller 40 controls the operations in a unit manual operation mode.

When the function key F2 is pressed by the operator, control process advances to a successive step of the unit manual operation. When the function key F3 is pressed, the unit manual operation is initiated in response to the instruction input by the key F3. When the function key F4 is pressed, the unit manual operation is stopped. When the function key F5 is pressed, the machining device 13 of the machining unit 12 will return to an original position. The functions corresponding to the respective function keys F6, F7 and F8 are similar to those of the automatic operation mode display 80.

The unit manual operation mode display can be changed to the manual operation mode display 110 for the unloading unit 18 as shown in FIG. 18. The manual operation mode display 110 includes display sections 113 and message sections 111 which indicate the various operational menus during the manual operation mode. Select buttons 116 and a function message section 115 are displayed at the central portion of the screen. The select buttons 116 are touch switches for selecting the operation contents. The function message section 115 indicates the operation corresponding to the select buttons 116.

A function display section 114 at the lower section of the screen indicates the operational options of the unloading unit 18 that correspond to the respective function keys F1 through F8. The screen will be changed to the previous one by pressing the function key F2. The screen will be changed to the successive one by pressing the function key F3. When the function key F4 is pressed, the unit 18 will return to its original position. When the function key 5 is pressed, the unit 18 is initiated. The functions corresponding to the respective function keys F1, F6 and F8 are similar to those of the automatic operation mode display 80.

The operation guide display 120 as shown in FIG. 19 includes a message section 121 and a function display section 124 which corresponds to the respective function keys F1 through F8. The display will be changed to a previous one by pressing the function key F2 and a successive one by pressing the function key F3. The functions corresponding to the respective function keys F1, F6 and F8 are similar to those of the automatic operation mode display 80.

The operational sequence of the transfer machine 10 according to this embodiment will now be described. At first, the menu display 70 is called up by manipulating a unit operation panel 20 selected from the multiple panels 20. The operator selects the desired operation from the menu display 70.

When an automatic operation mode is selected, every display screen of the display devices of all unit operation panels 20 are switched to the automatic operation mode display 80 for the cycle operation. Then, the operator first presses the function key F2 for starting a system preparatory operation. The preparatory operation is required whenever any kind of operation besides the cycle operation is to be initiated.

After the preparatory operation is completed, when cyclic, continuous operation is desired, the operator presses the function key F3 for automatic operation. Then, the transfer machine 10 is automatically and continuously operated to repeat predetermined machining steps to apply machining processes to the workpieces. During the automatic operation, the display sections 83 of the display device 69 always indicate the operating conditions. When the function key F4 is pressed by the operator, the automatic operation stops.

To execute the independent operation, "the independent operation mode" in the menu display is selected. Then, the display screen of the display device 69 is switched to the independent operation mode display 90. After the operator selects a desired independent operation 95 in the independent operation display section by selecting the function keys F2 and/or F3, the operator presses the function key F5. Then, the transfer machine 10 executes the predetermined independent operation. When the function key F4 is pressed by the operator, each of the operational tools or devices will be returned to the respective predetermined original positions in the independent operation mode. While the independent operation is executed, the operation conditions are continuously indicated in the display sections of the display device 69.

To execute an unit manual operation, "the unit manual operation mode" in the menu display is selected. Then, the display screen of the display device 69 is switched to the unit manual operation mode display 100. The machining unit 12 is independently operated by selecting the function keys F2 through F4. While the unit manual operation is executed, the operating conditions are continuously indicated in the display sections 103 of the display device 69. The operator can manipulate any one of the operation panels 20 to independently actuate the unloading unit 18. The manual operation mode display 110 for the unit 18 is called up during the manual operation mode.

According to the fifth embodiment, the transfer machine is controlled in the same manner as the first embodiment and therefore achieves the advantages and effects similar to those in the first embodiment. Further, according to the fifth embodiment, the desired operation can be controlled while switching the display screen of the display device 69 of the operation panel 20. Therefore, the operation panel 20 can be downsized, and can have many functions incorporated therein.

According to the fifth embodiment, the screen of the CRT is changeable in accordance with the individual operation modes and an operation instruction is achieved by selecting any one of the function keys displayed on the screen. This makes operation panels compact and facilitates the expansion of the functions or ability of the transfer machine system. An operator can watch the state of the entire transfer machine system anywhere by referring to the screen display indicating the state of the working units. It is required that this display be watched when inputting an operation instruction. This makes the system controllable by an operator and enhances the reliability of the system.

Sixth Embodiment

The sixth embodiment according to the present invention will now be described referring to FIGS. 20 through 24. The elements corresponding to those in the above described embodiments are given similar reference numerals to avoid the repetition of descriptions. The function of the unit dominated data memory 68 will be described herein in more detail.

Figure 20:
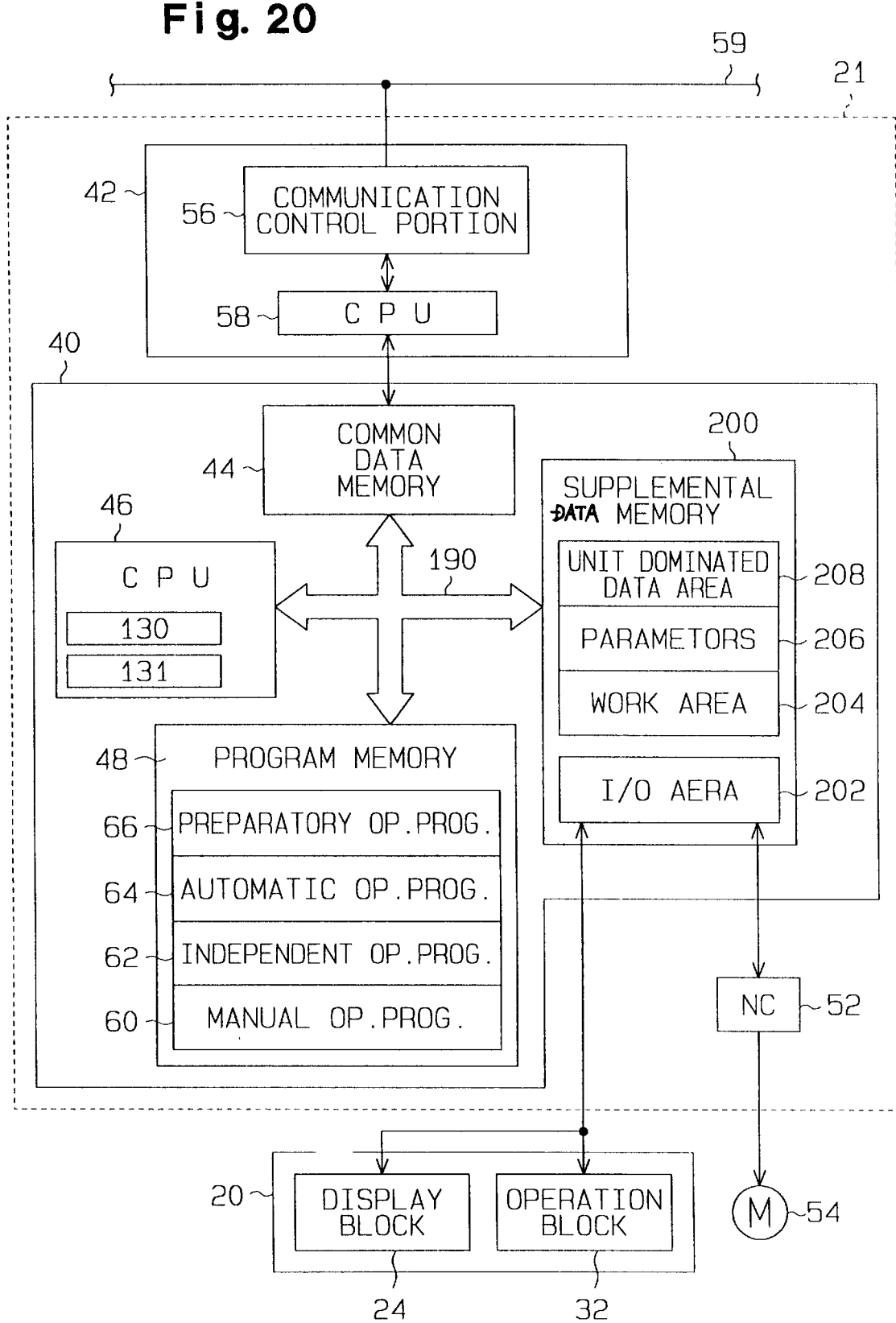

As shown in FIG. 20, each unit controller 40 as a unit controller comprises a central processing unit (CPU) 46, a common data memory 44, a program memory 48 and a supplemental data memory 200, which are coupled to one another via a data bus 190. The CPU 46 includes a data preparation portion 130 and a data transfer control portion 131 and acts as a control portion performing the processing of data concerning the status of the working units other than its own working unit. The program memory 48 stores the manual, independent, automatic and preparatory operation programs 60, 62, 64 and 66 as well as other control programs (not shown). The supplemental data memory 200 has a variety of memory areas such as a input and output (I/O) area 202, a work area 204, a parameter area 206 and a unit dominated data area 208.

This unit controller 40 adopts memory mapped I/O design so that the I/O area 202 couples to an NC controller 52 and display and operation blocks 24 and 32. Accordingly, the I/O area 202 corresponds to the I/O control portion 50 of the first embodiment as shown in FIG. 1. The unit dominated data area 208 corresponds to the unit dominated memory 68 of the first embodiment as shown in FIG. 1.

Identification (ID) data as a first program parameter, for distinguishing its own working unit from other working units, is stored in the parameter area 206. The parameter area 206 further stores data indicative of the number of all working units forming a transfer machine system as a second program parameter.

Figure 21:
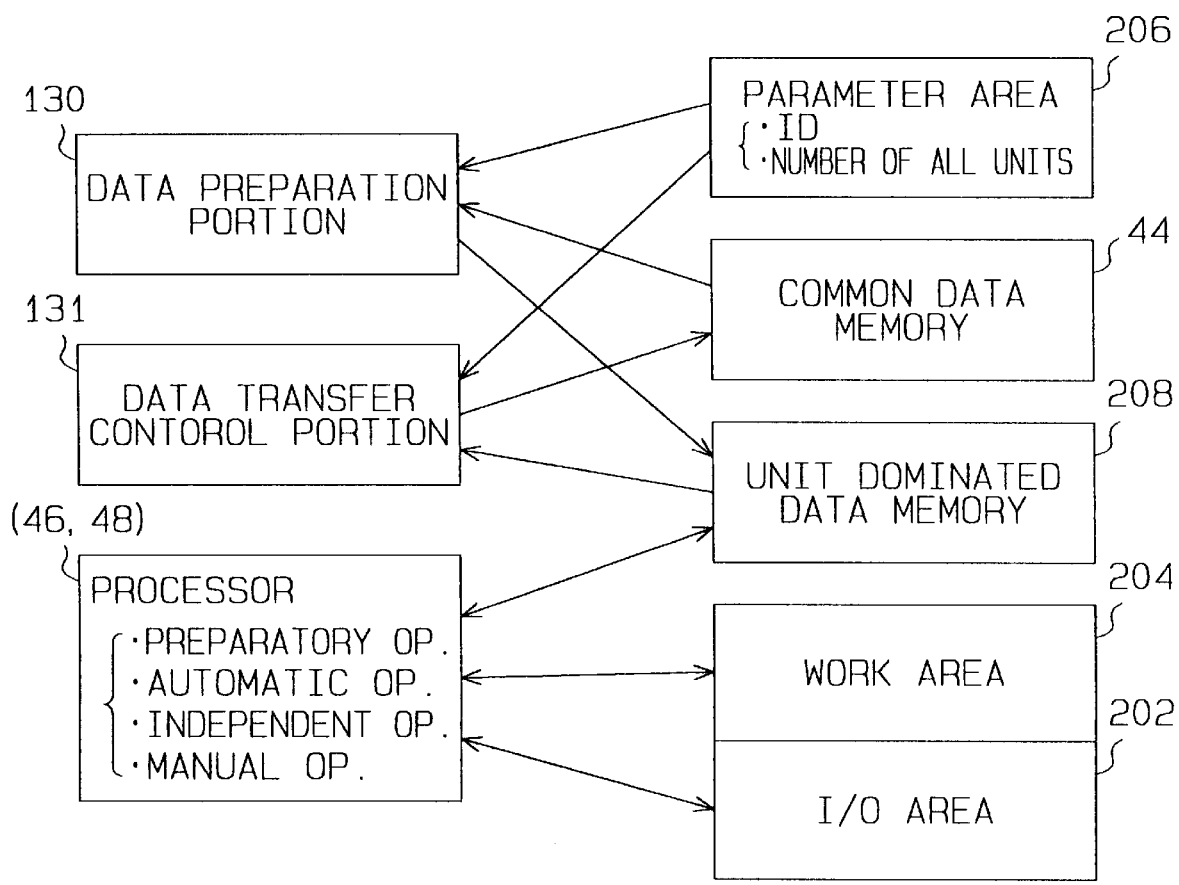

FIG. 21 schematically shows data communication in the unit controller 40. The ID data from the parameter area 206 is inputted to the data preparation and data transfer control portions 130 and 131. The data preparation portion 130 selectively receives status data or information concerning other working units, which is necessary for control of its own working unit, from the common data memory 44. The received data is subjected to "AND" logical operation or "OR" logical operation. The resultant data is temporarily accumulated as "AND data" or "OR data" in the portion 130 and is thereafter transferred to the unit dominated data area 208.

The data indicating the status of its own working unit, which is held in the I/O area 202 and work area 204, is restored as self-unit status data to the unit dominated data area 208 by the CPU 46. Additionally, the self-unit status data is sent to the common data memory 44 by the data transfer control portion 131, and causes the old self-unit status data in the memory 44 to be updated.

Figure 22:
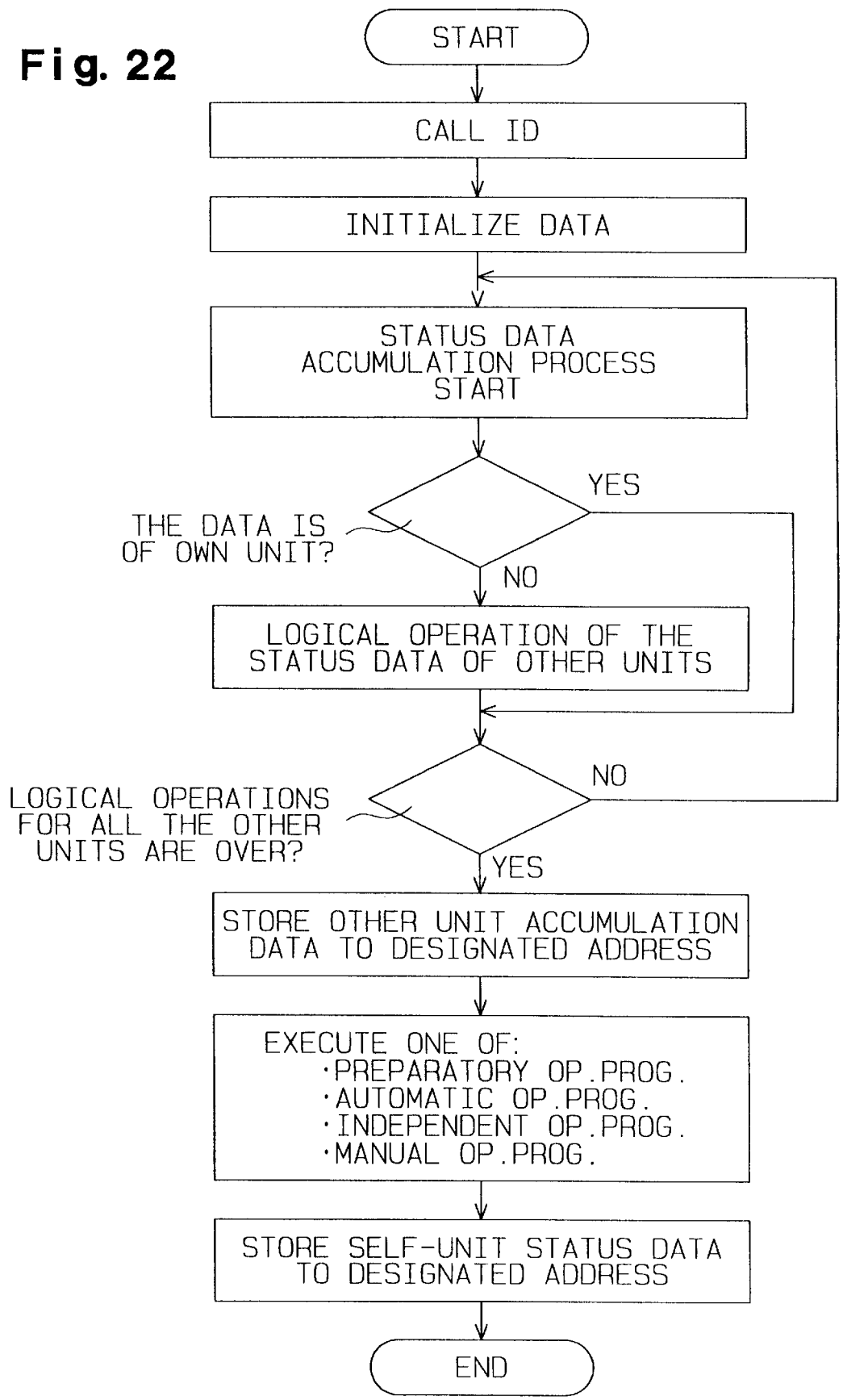

FIG. 22 is a flowchart of data processing. In response to the ID designation for its own working unit by the communication control device 42, the CPU 46 loads the newest unit status data about all units including its own and starts processing the unit status data. While determining "own" or "other" with reference to the ID as data, the status data about other working units is sequentially subjected to "AND" or "OR" logical operation. As the logical operations proceed, the resultant data is accumulated. The resultant data is stored as other unit accumulation data into predetermined addresses of the unit dominated data area 208.

The CPU 46 controls its own working unit in accordance with the operation programs 60, 62, 64, and 66 by referring to the newest self-unit status data and other unit accumulation data concerning other units' status, stored in the unit dominated data area 208. The status of its own working unit is indicated with self-unit status data in the data area 208. The self-unit status data is continuously updated.

FIG. 23 is a memory address table illustrating the relationship between data address and status data in the unit dominated data area 208. As shown in FIG. 23, memory addresses in the unit dominated data area 208 are assigned to various status data involved in its own and other working units, which is necessary at the determination steps as indicated in the flowcharts of FIGS. 7A, 7B, 8A and 8B. For example, the data describing whether its own unit has completed a preparatory operation is stored at address "M2822" while the data concerning the completion of preparatory operation for the other units, i.e., the resultant data of AND logical operation, is stored at address "M2922". The data describing whether an automatic operation mode is selected at its own unit is stored at address "M2823" while the similar data for the other units, i.e., the resultant data of AND logical operation, is stored at address "M2923". The data describing whether its own unit has been instructed to start an automatic operation is stored at address "M2824", while the corresponding data for the other units, i.e., the resultant data of OR logical operation, is stored at address "M2924".

The self-unit data and the other unit accumulation data may be further subjected to "AND" or "OR" logical operation, and the resultant data may be stored as all unit accumulation data into the unit dominated data area 208 as suggested by the broken line area of the memory address table shown in FIG. 23. For example, the all unit accumulation data describing whether automatic operation modes at all the units are selected is stored at address "M3023". These addresses of the unit dominated data area 298 coincide with sequence addresses used or defined in each operation program, respectively.

Figure 24:
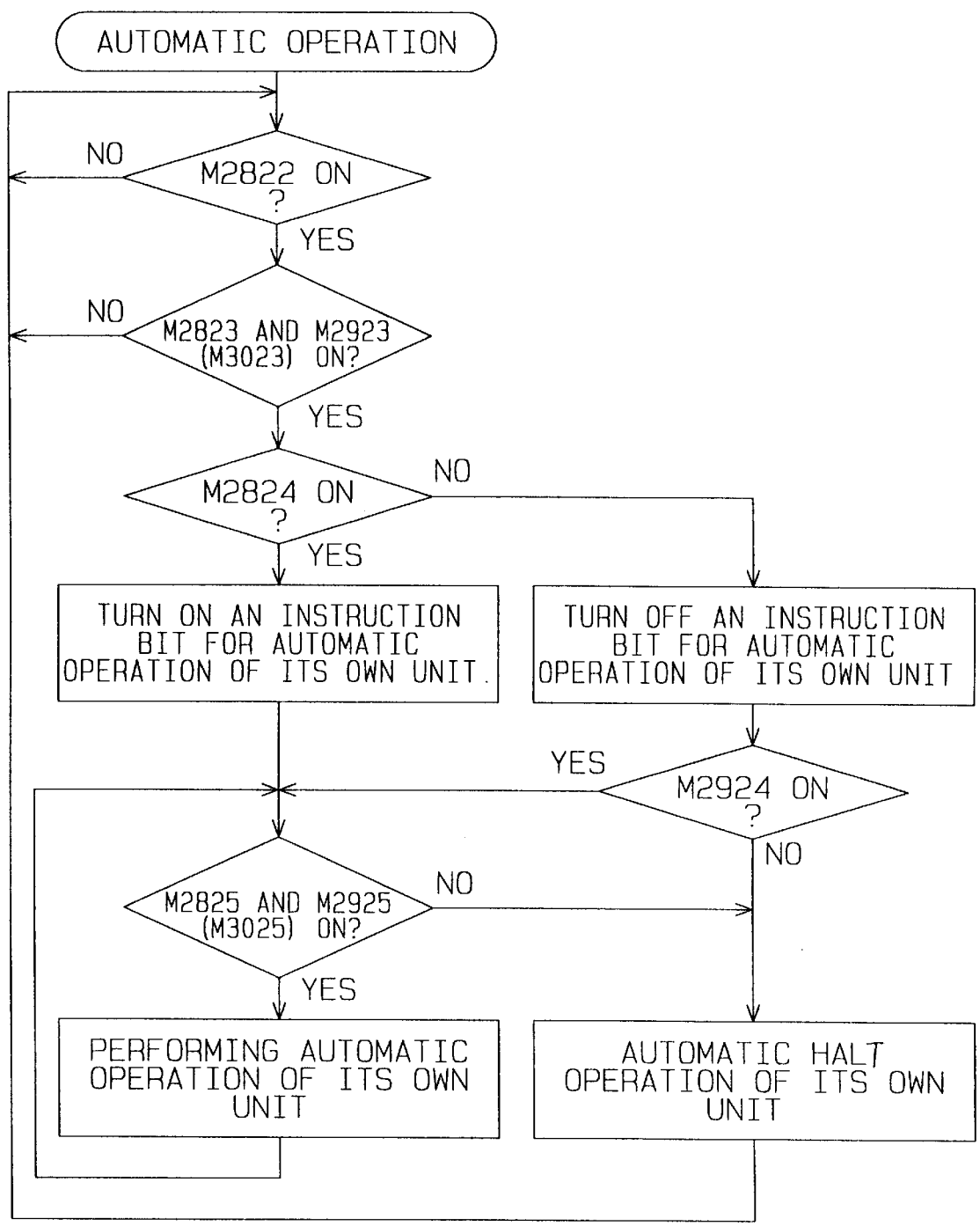

FIG. 24 is a flowchart to which the automatic operation program chart shown in FIG. 7B is rewritten in a format using sequence address. In respect of every status data, each sequence address of each operation program is identical to each address of the unit dominated data area 208. This allows respective working units to use the same operation programs.

According to this embodiment, the provision of the unit dominated data memory 208 for storing data necessary to the control of its own working unit only, improves the speed of data processing based on each operation program at each working station. The use of the resulting data from "AND" or "OR" operation, the data being stored in the unit dominated data area 208, reduces the load of the CPU 46 in data processing. Consequently, rapid data processing by the CPU 46 is achieved. In addition, large size programs having the function of "AND" and "OR" logic operation are not required so that memory capacity of the program memory 48 is saved.

In this embodiment, the memory addresses of the self-unit data and other unit accumulation data in the unit dominated data area 208 coincide with the sequence addresses of each operation program. Accordingly, each operation program need not have a sub-routine for determining whether received data is of its own or another unit. This allows all the working units to use the same operation programs (except for the manual operation program). As a result, the production cost of the transfer machine system according to this invention is lower than that of conventional system having a host computer.

With reference to ID data for self/other identification, self-unit status data and other unit status data can be respectively stored at designated addresses in each data memory. The ID is usually input to the unit controller 40 by an operator manipulating the operation panel 20. However, the ID may be pre-set in the communication control device 42 and may be transferred to the unit dominated data area 208 from the communication control device 42. The ID may be temporarily held in the work area 204, and may be transferred to the unit dominated data area 208 from the work area 204. The use of the ID program parameter style simplifies each operation program.

In this embodiment, the above described "AND" and "OR" logical operations may be executed by a ladder circuit separated from the CPU 46.

Seventh Embodiment

Figure 25:
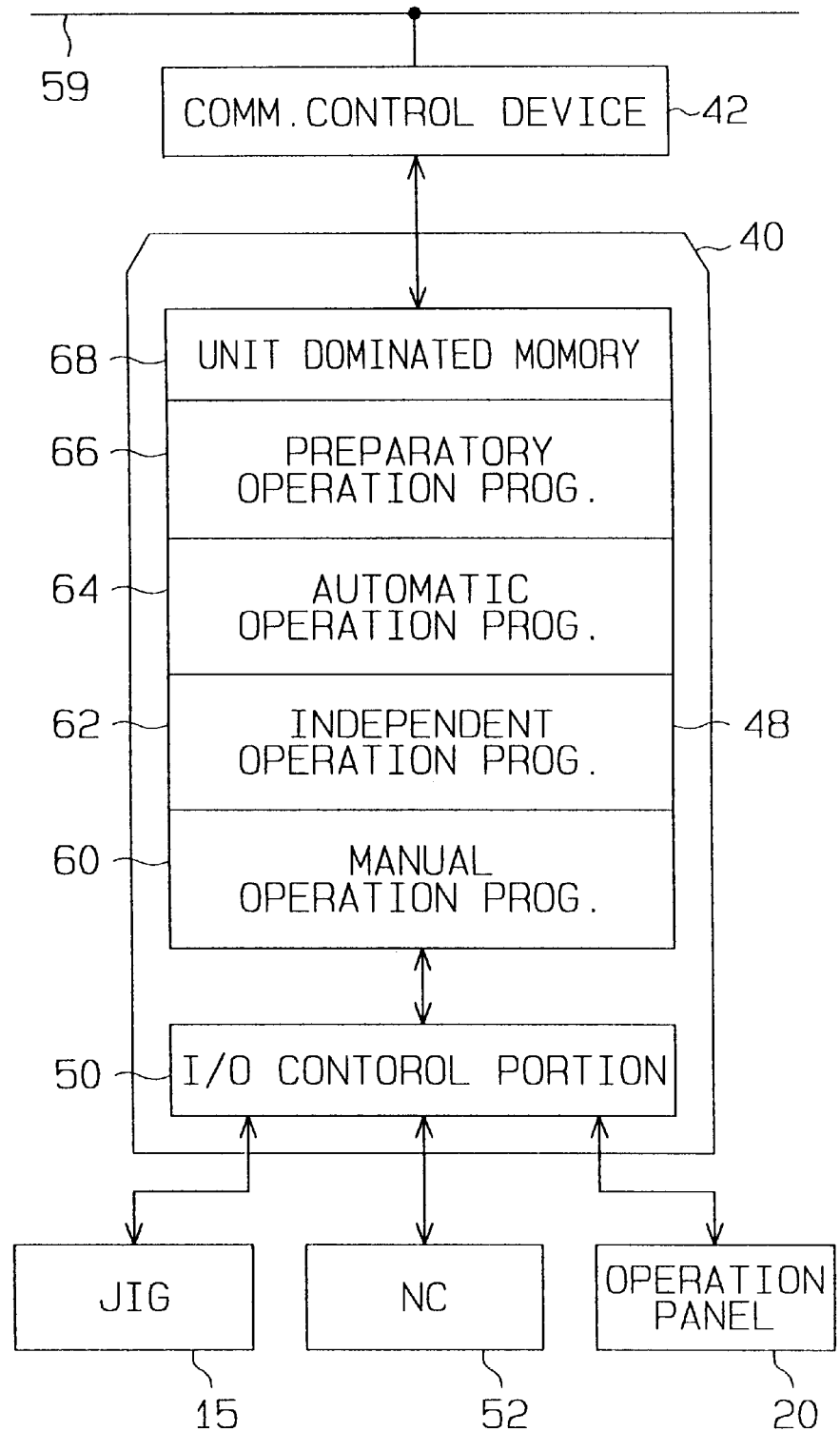
FIG. 25 is a block diagram showing a part of the control system of the transfer machine of a seventh embodiment according to the present invention.

The seventh embodiment according to the present invention will now be described referring to FIG. 25. The elements corresponding to those in the first embodiment are given similar reference numerals. As shown in FIG. 25, a unit controller 40 according to this embodiment has no common data memory 44 as shown in FIG. 1.

The unit dominated memory 68 stores rewritable data describing the status of its own working unit. Each communication control device 42 transfers self-unit status data stored in the unit dominated memory 68 to all the other unit controllers 40 via the communication line as a data bus. Also, each communication control device 42 receives the status data concerning the other working units from the other unit controllers 40 and selects the other units' status data necessary to the control of its own working unit. The selected data is stored (i.e., over-written) at designated addresses in the unit dominated memory 68. In other words, the communication control device 42 has the same function as that of the data preparation portion 130 shown in FIG. 20.

According to this embodiment, since no common data memory is required, each unit controller can be down-sized. The unit dominated memory 68 corresponds to the unit dominated data area 208 shown in FIG. 20, and therefore, creates some advantages as described with respect to the sixth embodiment.

Although several embodiments of the present invention have been described herein, it should be apparent to those skilled in the art that the present invention may be embodied in many other specific forms without departing from the spirit or scope of the invention. Particularly, it should be understood that the following modifications may be embodied according to the present invention.

Although each of the working units according to the first embodiment includes the operation buttons that transmit an instruction to all the working units, the necessary buttons may be selected among the operation buttons and only the selected buttons may be installed at the individual operation panels. The lights in the display blocks or panels can be treated in the same manner as the operation buttons. An operation block for operating all the working units with the common operations may be installed in a single operation panel and the operation panels of the other working units may include operation buttons only for operating the respective operational tools or devices.

Although one working unit is formed with one or two machining devices and jigs in the above-described embodiments, the machining device and jig may be separated so that the separated devices can form independent working units. Further, each of two machining devices, which are facing each other at every station, may independently form a single working unit. A single CPU can control an arbitrary number of working units within the ability of the CPU.

The present examples and embodiments are to be considered as illustrative and not restrictive and the invention is not to be limited to the details giving herein, but may be modified within the scope of the appended claim.

What is claimed is:

1. A control apparatus for controlling a transfer machine, wherein the transfer machine includes a plurality of working stations, between which each of a plurality of work pieces is transferred, and a plurality of working units for performing various tasks, each working station including at least one of the working units to perform a given working step, each working unit including at least one operational device for performing a task, the control apparatus comprising:

a plurality of independent unit controllers, each corresponding to and controlling at least one of the working units, wherein each working unit is controlled by only one unit controller;

a plurality of communication control devices, wherein one of the communication control devices is coupled to each unit controller;

a data bus for connecting the communication control devices to one another and for allowing data communication between the unit controllers;

a plurality of common data memories, wherein one common data memory is included in each unit controller, wherein each unit controller controls its own common data memory, and wherein each common data memory stores updated status data concerning the status of all the working units;

a plurality of program memories, wherein one program memory is included in each unit controller, wherein each program memory stores at least one manual operation program for manually operating the corresponding unit independently, at least one independent operation program for performing an independent operation related to the transfer of workpieces, at least one automatic operation program for performing a cynical operation at the corresponding working unit, and at least one preparatory operation program for preparing the corresponding working unit for operation; and a plurality of drive control means wherein one drive control means is included in each unit controller, and wherein each drive control means is coupled to the common data memory and to the program memory of the corresponding unit controller, wherein the drive control means control the corresponding operational devices based on the status data stored in the corresponding common data memory and based on a selected operation program stored in the corresponding program memory;

wherein the communication control devices supply data concerning the status of the corresponding working units directly to the other unit controllers and receive status data concerning the status of the other working units directly from their corresponding unit controllers to update the status data stored in each common data memory with the received status data such that all of the units controllers in the transfer machine store common status data, and further wherein each working unit is constructed and arranged to be controlled by its corresponding unit controller unit only the programs and the status data stored in the corresponding unit controller such that each working unit is controlled only by the program execution of and the status data stored in the unit controller with which that working unit is associated, and thus each unit controller operates independently.

2. The apparatus according to claim 1, wherein each communication control device includes a processor for controlling communication between the communication control device and the common data memory, and wherein each communication control device is constructed and arranged to communicate directly with every other communication control device of the transfer machine to share the updated status data.

3. The apparatus according to claim 1, wherein the independent, automatic, and preparatory operation programs in one unit controller are identical to those in every other unit controller.

4. The apparatus of claim 1, wherein the independent operation includes clamping and unclamping or workpieces simultaneously at all work stations.

5. The apparatus of claim 1, wherein said at least one operational device is a jig for clamping and unclamping a workpiece.

6. The apparatus according to claim 1, wherein one of the working units is a transfer device for transporting the work pieces.

7. An apparatus for controlling a transfer machine, wherein the transfer machine includes a plurality of working stations, between which each of a plurality of work pieces is transferred, and a plurality of working units for performing various tasks, each working station including at least one of the working units to perform a given working step, each working unit including at least one operational device for performing a task, the control apparatus comprising:

a plurality of unit controllers, each corresponding to at least one of the working units, wherein the unit controllers control the corresponding operational devices during the performance of the working step, and wherein each working unit is controlled by only one unit controller;

a plurality of communication control devices wherein one of the communication control devices is coupled to each unit controller;

a data bus for connecting the communication control devices to one another and for allowing data communication between the unit controllers;

a plurality of common data memories, wherein one common data memory is included in each unit controller, wherein each unit controller controls its own common data memory, and wherein each common data memory stores updated status data concerning the status of all the working units;

a plurality of program memories, wherein one program memory is included in each unit controller, wherein each program memory stores at least one manual operation program for manually operating the corresponding unit independently, at least one independent operation program for performing an independent operation related to the transfer of workpieces, at least one automatic operation program for performing a cyclical operation at the corresponding working unit, and at least one preparatory operation program for preparing the corresponding working unit for operation;

a plurality of drive control means, wherein one drive control means is included in each unit controller, wherein each drive control means is coupled to the common data memory and to the program memory of the same unit controller, wherein the drive control means control the corresponding operational devices based on the status data stored in the corresponding common data memory and based on a selected operation program stored in the corresponding program memory; and wherein each communication control device supplies data concerning the status of the corresponding at least one working unit directly to the unit controllers corresponding to the other working units and receives status data concerning the status of the other working units directly from their corresponding unit controllers to update the status data stored in the common data memory with the received status data such that all the unit controllers in the transfer machine store common status data.

8. The apparatus according to claim 7, wherein each working unit is controlled by its corresponding unit controller using only the programs and the status data stored in that corresponding unit controller, and thus each unit controller operates independently.

9. The apparatus according to claim 7, wherein said at least one operational device is a jig for clamping and unclamping a workpiece.

10. The apparatus according to claim 7, wherein the independent operation includes clamping and unclamping of workpieces simultaneously at all work stations.

11. The apparatus according to claim 7, wherein the independent, automatic, and preparatory operation programs are the same in every unit controller.

12. The apparatus according to claim 7, wherein one of the working units is a transfer device for transporting the work pieces.

13. The apparatus according to claim 7, wherein each unit controller includes:
    a unit dominated data memory for storing information necessary for the corresponding working unit; and
    a data processing unit for selectively reading status data concerning the working units from the common data memory for controlling the corresponding working unit and for outputting the selectively read status data to the unit dominated memory.

14. The apparatus of claim 13, wherein each data processing unit includes a data preparer for subjecting the selected data concerning the status of the other working units to a logical operation thereby generating other unit status accumulation data, and wherein each unit dominated data memory stores the other unit status accumulation data and status data concerning the corresponding working unit.

15. The apparatus according to claim 14, wherein said other unit status accumulation data is used to execute each operation program, and wherein a memory address of the other unit status accumulation data at said unit dominated data memory coincides with a sequence address in each operation program.

16. The apparatus according to claim 7, wherein the status data of each common data memory includes a plurality of instruction bit data indicating whether one of a preparatory operation, an automatic operation, an independent operation or a manual operation has been instructed in each working unit.

17. The apparatus according to claim 7, wherein, at each working station, an operation panel is provided in association with each working unit, wherein each operation panel is provided with instruction input means for instructing its corresponding working unit to selectively performing a preparatory operation, an automatic operation, an independent operation or a manual operation.

18. The apparatus according to claim 17, wherein each of said operation panels includes a display device, wherein said display device displays information regarding the operational status of the overall transfer machine on the screen.

19. The apparatus according to claim 7, wherein, at each working station, an operation panel is provided in association with each working unit, and wherein each operation panel is provided with input means for instructing a transfer movement.

20. The apparatus according to claim 7, wherein the transfer machine includes a jig located at each station for holding one of the work pieces in a predetermined position in relation to the corresponding operational device, wherein each jig selectively performs a clamp operation for clamping a work piece and an unclamp operation for unclamping a work piece, wherein all the jigs simultaneously perform one of the clamping and the unclamping operations based on status data concerning clamping and unclamping and based on execution of the independent program in the corresponding unit controller.

21. A method of controlling a transfer machine, said transfer machine including a plurality of working stations, between which work pieces are transferred, each working station including a working unit to perform a given working step, wherein a plurality of unit controllers control corresponding ones of the working units such that each working unit is controlled by one unit controller, all the unit controllers being capable of communicating directly with one another via a data bus, each unit controller having its own data memory and its own program memory storing preparatory, automatic independent and manual operation programs, said method comprising the steps of:
    receiving unit status data describing the present status of all the working units in each working unit, wherein the unit status data is received directly from the other working units;
    storing the unit status data describing the present status of all the working units in each data memory;
    frequently and directly supplying the other unit controllers with new working unit status data to update the unit status data stored in each data memory with the supplied status data so that each of the controllers stores current unit status data, wherein each unit controller controls its own data memory; and
    referring, in each unit controller, to the newest unit status data reflecting the status of its own working unit and the other working units' status so that each unit controller controls the associated working unit following one of said operation programs, independent of the remaining controllers.

22. A method of controlling a transfer machine including a plurality of working stations between which work pieces are transferred, and a plurality of unit controllers, each working station including at least one working unit to perform a given working step, wherein each of the working units is controlled by one of the unit controllers, all the unit controllers being capable of communicating directly with one another via a data bus, each controller having its own data processing unit, its own common data memory and its own program memory, wherein the program memory stores at least one operation program, said method comprising the steps of:
    storing the unit status data describing the present status of all the working units in each data memory;
    frequently and directly supplying the other unit controllers with new working unit status data to update the unit status data stored in each data memory with the supplied status data so that each of the controllers stores current unit status data, wherein each unit controller controls its own data memory;
    reading certain data in each unit controller, wherein the certain data reflects the unit status of the working units associated with the other unit controllers;
    subjecting the read certain data to a logical operation in each unit controller;
    storing the resultant data of said logical operation as other unit status accumulation data into each data memory; and
    controlling a corresponding one of the working units with each unit controller, wherein each unit controller refers to unit status data stored therein that reflects the status of the corresponding working unit and refers to the other unit status accumulation data stored therein, so that each unit controller independently controls the corresponding one of the working units according only to the execution of the operation program stored therein and the status data stored therein.

23. The method according to claim 22, wherein said storing step comprises:
    storing said other unit status accumulation data at an address of the common data memory that coincides with a sequence address defined in the operation program.

24. The method according to claim 22, wherein each unit controller stores a preparatory operation program for preparing the corresponding working unit for operation, wherein the preparatory operation program performs the following steps in its own unit controller:

determining whether a preparatory operation has been instructed to be performed in the corresponding working unit;

setting the instruction bit data concerning the preparatory operation for the corresponding working unit to ON when the preparatory operation has been instructed, and otherwise setting it to OFF;

determining whether the instruction bit data concerning the preparatory operation for any one of the other working units is set to ON or not;

determining whether all of the working units can perform preparatory operations when the instruction bit data concerning the preparatory operation for any one of the working units is set "ON"; and allowing the corresponding working unit to start a predetermined preparatory operation when all the working units can perform preparatory operations.

25. The method according to claim 22, wherein each unit controller stores an automatic operation program for performing a cyclic operation, wherein each automatic operation program performs the following steps in its own unit controller:

determining whether all the working units are set to automatic operation mode when the corresponding working unit has completed a preparatory operation;

determining whether an automatic operation has been instructed in the corresponding working unit when all the working units are in automatic operation mode;

setting an instruction bit data concerning automatic operation for the corresponding working unit to "ON" when automatic operation is instructed therein, and otherwise setting it to OFF; and determining, from status data stored in the associated unit controller, whether automatic operation has been instructed for any of the other working units;

determining whether all the working units can perform automatic operations; and allowing the corresponding working unit to start a predetermined automatic operation when all the working units can perform automatic operations.

26. The method according to claim 22, wherein each unit controller stores an independent operation program for performing an operation relating to the transfer of workpieces, wherein each independent operation program performs the following steps in its own unit controller;

determining whether the corresponding working unit is set to an independent operation mode when the corresponding working unit has completed a preparatory operation;

determining whether the other working units are set to automatic operation mode;

determining whether an independent operation is instructed in the corresponding working unit when the corresponding working unit is in an independent operation mode;

setting an instruction bit data concerning independent operation for the corresponding working unit to ON when the independent operation is instructed, otherwise setting it to OFF;

determining whether instruction bit data concerning the independent operation for any one of the other working units is set to ON when the corresponding working unit is not in the independent operation mode;

determining whether the corresponding working unit can perform an independent operation when instruction bit data concerning the independent operation for any one of the working units is set ON; and allowing the corresponding working unit to start a predetermined independent operation when it is determined that the corresponding working unit can perform an independent operation.

27. The method according to claim 26, wherein the independent operation is performed at all working units when it is performed at any one working unit.

28. The method according to claim 22, wherein each unit controller stores a manual operation program for manually operating the corresponding working unit independently, and wherein each manual operation program performs the following steps in its own unit controller:

determining whether the corresponding working unit is set to a manual operation mode when the corresponding working unit has completed a preparatory operation;

determining whether a manual operation is instructed in the corresponding working unit when the corresponding working unit is in the manual operation mode;

determining whether the corresponding working unit can perform a manual operation, when a manual operation is instructed in the corresponding working unit; and allowing the corresponding working unit to start a predetermined manual operation when it is determined that the corresponding working unit can perform a manual operation.

* * * * *

UNITED STATES PATENT AND TRADEMARK OFFICE
CERTIFICATE OF CORRECTION

PATENT NO. : 5,914,880
DATED : June 22, 1999
INVENTOR(S) : Toshio Yasojima, Masanori Imai It is certified that error appears in the above-indentified patent and that said Letters Patent is hereby corrected as shown below:

```
On the title page, insert the following:
     [30]      Foreign Application Priority Data
        May 16, 1992   [JP]   Japan..................4-149957
        Mar 12, 1993   [JP]   Japan..................5-78879
```

Signed and Sealed this

Twenty-third Day of November, 1999

Attest:

Q. TODD DICKINSON

Attesting Officer

Acting Commissioner of Patents and Trademarks